(12) United States Patent
Wellen et al.

(10) Patent No.: US 11,393,201 B2
(45) Date of Patent: *Jul. 19, 2022

(54) VEHICLE IDENTIFICATION SYSTEM AND METHOD

(71) Applicant: Motor Trend Group, LLC, El Segundo, CA (US)

(72) Inventors: Alex Wellen, El Segundo, CA (US); Pepper Chiavacci, El Segundo, CA (US)

(73) Assignee: Motor Trend Group, LLC, El Segundo, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/008,384

(22) Filed: Aug. 31, 2020

(65) Prior Publication Data

US 2020/0410238 A1 Dec. 31, 2020

Related U.S. Application Data

(63) Continuation of application No. 16/740,364, filed on Jan. 10, 2020, now Pat. No. 10,783,374.

(Continued)

(51) Int. Cl.
*G06V 20/20* (2022.01)
*G06N 3/04* (2006.01)
(Continued)

(52) U.S. Cl.
CPC ............. *G06V 20/20* (2022.01); *G06K 9/627* (2013.01); *G06K 9/6262* (2013.01);
(Continued)

(58) Field of Classification Search
None
See application file for complete search history.

(56) References Cited

U.S. PATENT DOCUMENTS 6,771,838 B1 * 8/2004 Fan .................... G06T 5/004
358/519
10,713,564 B2 * 7/2020 Katz ..................... G06N 3/006
(Continued)

OTHER PUBLICATIONS

Internationa Search Report and Written Opinion, PCT/US20/13242, dated Apr. 16, 2020.

(Continued)

*Primary Examiner* — Andrae S Allison
(74) *Attorney, Agent, or Firm* — Fox Rothschild LLP

(57) ABSTRACT

The system and method are configured to identify cars and obtain information about the identified cars. The system and method involves a software application installed on a computing device that includes a camera configured to capture images. After the software application is installed, the user can activate the camera through the software application and point the camera at a vehicle. The software application includes an object recognition function that can recognize the vehicle in the view of the camera. After recognizing the vehicle, the software application displays information about vehicle on a screen of the computing device. The software application can be used with an event such as an auto show. In addition to identifying the cars, the identified information can be used for other purposes such as a part of a scavenger hunt or other contests. Awards can be given to participants who complete the contest.

20 Claims, 25 Drawing Sheets

Related U.S. Application Data

(60) Provisional application No. 62/791,707, filed on Jan. 11, 2019.

(51) Int. Cl.
*G06N 3/08* (2006.01)
*G06K 9/62* (2022.01)
*G07F 17/32* (2006.01)
*A63F 13/80* (2014.01)

(52) U.S. Cl.
CPC ............ *G06N 3/0454* (2013.01); *G06N 3/08* (2013.01); *A63F 13/80* (2014.09); *G06V 2201/08* (2022.01); *G07F 17/3253* (2013.01); *G07F 17/3286* (2013.01)

(56) References Cited

U.S. PATENT DOCUMENTS

| | | | | |
|---|---|---|---|---|
| 2008/0001916 | A1* | 1/2008 | Nozaki | H04N 9/3194 |
| | | | | 345/156 |
| 2012/0147190 | A1* | 6/2012 | Ioli | G06Q 20/40 |
| | | | | 348/149 |
| 2013/0002713 | A1* | 1/2013 | Souparis | G07F 7/125 |
| | | | | 345/629 |
| 2013/0013347 | A1* | 1/2013 | Ling | G06Q 10/0833 |
| | | | | 705/4 |
| 2013/0223673 | A1* | 8/2013 | Davis | G06Q 30/00 |
| | | | | 382/100 |
| 2016/0350336 | A1 | 12/2016 | Checka et al. | |
| 2017/0084082 | A1* | 3/2017 | McTaggart | H04L 67/18 |
| 2017/0109916 | A1* | 4/2017 | Kurz | G06T 19/006 |
| 2017/0140452 | A1* | 5/2017 | Li | G06Q 30/0623 |
| 2018/0137406 | A1 | 5/2018 | Howard et al. | |
| 2020/0143197 | A1* | 5/2020 | Zmijewski | G06K 9/62 |

OTHER PUBLICATIONS

H. Huttunen, F. S. Yancheshmeh and Ke Chen, "Car type recognition with Deep Neural Networks," 2016 IEEE Intelligent Vehicles Symposium (IV), Gothenburg, 2016, pp. 1115-1120, doi: 10.1109/IVS.2016.7535529. (Year: 2016).

Jia Deng et al., "ImageNet: A Large-Scale Hierarchical Image Database," Dept. of Computer Science, Princeton University, USA, 2009, 8 pages, image-net.org/papers/imagenet_cvpr09.pdf.

Andrew G. Howard et al, MobileNets: Efficient Convolutional Neural Networks for Mobile Vision Applications, Google Inc., arXiv:1704.04861v1 [cs.CV] Apr. 17, 2017.

* cited by examiner

VEHICLE IDENTIFICATION SYSTEM AND METHOD

CROSS-REFERENCE TO RELATED APPLICATION(S)

This application is a continuation of U.S. application Ser. No. 16/740,364 filed Jan. 10, 2020, which claims the benefit of U.S. Provisional Application 62/791,707, filed Jan. 11, 2019, the entirety of each which are herein incorporated by reference.

FIELD OF THE INVENTION

The present invention is related to systems and methods for identifying objects in an image. More particularly, the systems and methods involve artificial neural networks for mobile and embedded vision applications and reducing computational complexity.

BACKGROUND OF THE INVENTION

Technologies for identifying objects in an image are known in the art. Those technologies employ machine learning systems that are computationally intensive. Conventional machine learning systems use traditional convolution techniques that require processing a large number of parameters. The layers in the neural network include many nodes, labels, weights, and other parameters connected together. The connected nodes, labels, weights, and other parameters are known as a graph or graphs. Traditional convolution techniques methods need to analyze every or almost every parameter in the graph and perform a series of mathematical operations (e.g., addition, subtraction, multiplication, and division). These analysis and operations, or floating point multiplication operations, demand substantial computing power.

Moreover, conventional machine learning systems are configured to perform general tasks (e.g., identifying whether the object in the image is a cat, dog, car, boat, airplane, etc.) and may not be accurate in performing specific tasks (e.g., identifying whether the object in the image is a particular type of car, such as a Toyota Camry, Honda Accord, Ford Taurus, etc.). Training such systems are also complicated and time consuming because they require using a very large set of images and training the entire system.

There is a need in the art for improved systems and methods for processing images and identifying objects in the images.

SUMMARY OF THE INVENTION

In accordance with principles of the invention, a computer-implemented method for identifying a vehicle is contemplated. The method comprises implementing a software application on a mobile device configured to identify vehicles in an auto show event and to obtain information about vehicles and unlock prizes. The execution of the software application allows a processor and memory of the mobile device to: implement a first database including target vehicles in the auto show event; implement a second database including prize information; activate a camera of the mobile device; identify a vehicle in the view of the camera, wherein the step of identifying includes recognizing that the vehicle in the view matches or closely matches a target vehicle stored in the first database and displaying vehicle information of the target vehicle when the identified vehicle matches or closely matches the target vehicle on a screen of the mobile device; identify the target vehicle to which the vehicle in the view of the camera matches or closely matches as an unlocked vehicle and track a number of unlocked vehicles; and present prize information from the second database on the screen of the mobile device according to the number of unlocked vehicles.

In one embodiment, information of each of the target vehicles stored in the first database is inaccessible to user of the software application before the target vehicle is identified by the software application as an unlocked vehicle.

In one embodiment, the execution of the software application allows a processor and memory of the mobile device to further implement a control interface configured to control user access to the information of each of the target vehicles stored in the first database. The control interface is configured to require user of the software application to perform additional interactions with the software application after the software application recognizing that the vehicle in the view of the camera matches or closely matches a target vehicle stored in the first database in order to identify the target vehicle as unlocked vehicle.

In one embodiment, the execution of the software application allows a processor and memory of the mobile device to further compare the number of unlocked vehicles with another number of unlocked vehicles tracked by the software application implemented on another mobile device. The execution of the software application allows a processor and memory of the mobile device to further present prize information from the second database on the screen of the mobile device based on the step of comparison.

In one embodiment, the execution of the software application allows a processor and memory of the mobile device to further present prize information from the second database on the screen of the mobile device when a specific target vehicle is identified as unlocked.

In one embodiment, the step of identifying a vehicle is executed by a machine learning machine. The machine learning machine includes a detection component of a pre-trained neural network, wherein the detection component is configured to detect patterns, edges, shapes, and other characteristics of an object in a set of images containing the object, wherein the object is not a vehicle; and a neural network configured to receive another set of images that each contains a vehicle and relied on the detection component to learn that each image contains the vehicle.

In one embodiment, the step of identifying a vehicle is executed by a machine learning machine. The machine learning machine includes a first artificial neural network configured to receive the frame, detect features of the object in the frame, and produce a features vector representative of the detected features; and a second artificial neural network configured to receive the features vector and classify the features vector to one of the category labels implemented on the second artificial neural network. The machine learning system is configured to identify the object in the frame based on the category label to which the features vector is classified.

In one embodiment, the step of identifying a vehicle is executed by a machine learning machine. The machine learning machine includes a first artificial neural network configured to receive the frame, detect features of the vehicle in the frame, and produce a features vector representative of the detected features, wherein the first artificial neural network is a feature learning neural network from a general task artificial neural network that has been trained with images from a large dataset, wherein the images from the large dataset include no images of the target vehicles; and a second artificial neural network configured to receive the features vector and classify the features vector to one of the category labels implemented on the second artificial neural network, wherein the second artificial neural network is an image classification neural network from a custom neural network and the image classification neural network has been trained using the feature learning neural network from a general task artificial neural network and with images from a small dataset, wherein the images from the small dataset include images of the target vehicles.

Counterpart system and computer-readable medium embodiments would be understood from the overall disclosure. Also, broader, narrower, or different combinations of the described features are contemplated, such that, for example, features can be removed or added in a broader or narrower way.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which.

DETAILED DESCRIPTION OF THE INVENTION

Figure 1:
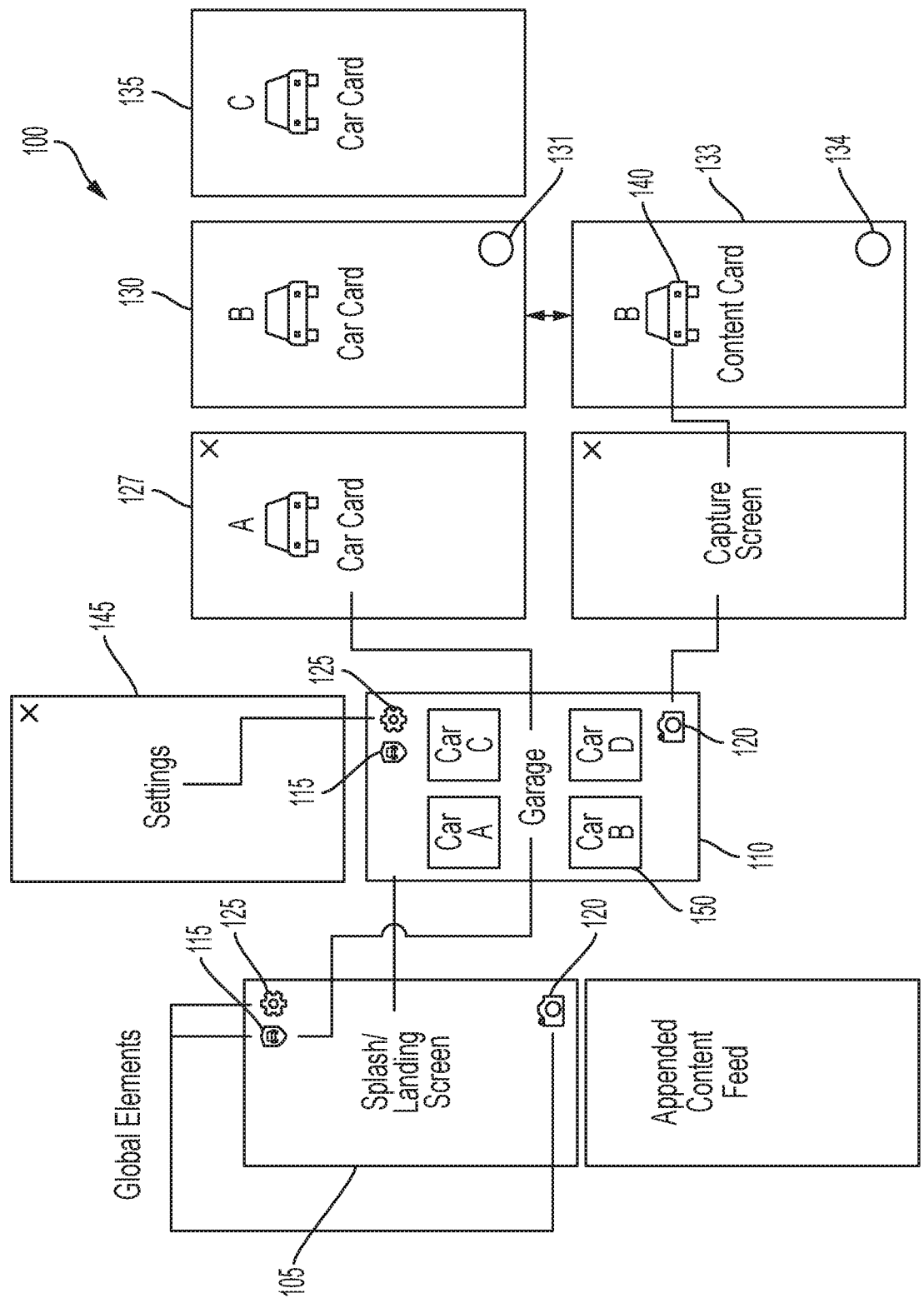
FIG. 1 depicts part of the user interface of the software application in accordance with some embodiments of the present invention.

Embodiments of the present invention are related to a software application configured to identify vehicles (e.g., cars) that can be used to obtain information about the vehicles. The software application can be installed on a computing device that includes a camera configured to capture still images. After the software application is installed, the user can activate the camera through the software application and point the camera at a vehicle. The software application includes an object recognition function that can recognize the vehicle in the view of the camera.

After recognizing the vehicle, the software application displays information about vehicle on a screen of the computing device. The information can include the manufacturer of the vehicle (e.g., Toyota), the model number or name of the vehicle (e.g., Camry), the year in which the vehicle is made or to be debuted (e.g., 2025), and other information (e.g., horse power, engine size, torque, chassis dimensions, etc.) about the vehicle.

In one embodiment, the cars to be identified can be presented in a confined environment, such as an auto show. In addition to specifically identifying the cars, the identified information can be used for other purposes. For example, a number of different vehicles can be identified as part of a contest, e.g., to see how many different cars can be identified by a particular user. Additionally, the identification of vehicles can be used as part of a scavenger hunt or other contest. If desired, awards can be given for successful participation in the contest or for those who complete the contest more quickly or effectively than the other participants.

Every time the user uses the camera to identify a vehicle, the identified vehicle is "unlocked" by the software application and saved in a "garage" (database) of the software application. This allows the user to collect information on a number of different vehicles. The garage stores all the vehicles the user has unlocked and the user can access the unlocked vehicles stored in the garage and their information at a later time. The software application can also track the number of vehicles the user has unlocked and the number of vehicles remain to be unlocked. For example, the software application can be implemented as a scavenger hunt game which requires the user to unlock all the vehicles in the auto show. After unlocking all the vehicles, the user can be awarded a prize. The first user to unlock all vehicles can be given an additional award. An award can be, for example, a monetary award or non-monetary award (e.g., coupons, discounts, gift cards, free magazine subscription, tangible items, services, etc.). The user can also be given prizes in stages, such as unlocking X number of vehicles entitles the user to receive prize A, unlocking Y number of vehicles entitles the user to receive prize B, and unlocking all the vehicles entitles the user to receive the top prize. The software application encourages the user to visit all the vehicles introduced at the show and travel to different locations in the venue in which the vehicles are shown.

Figure 2:
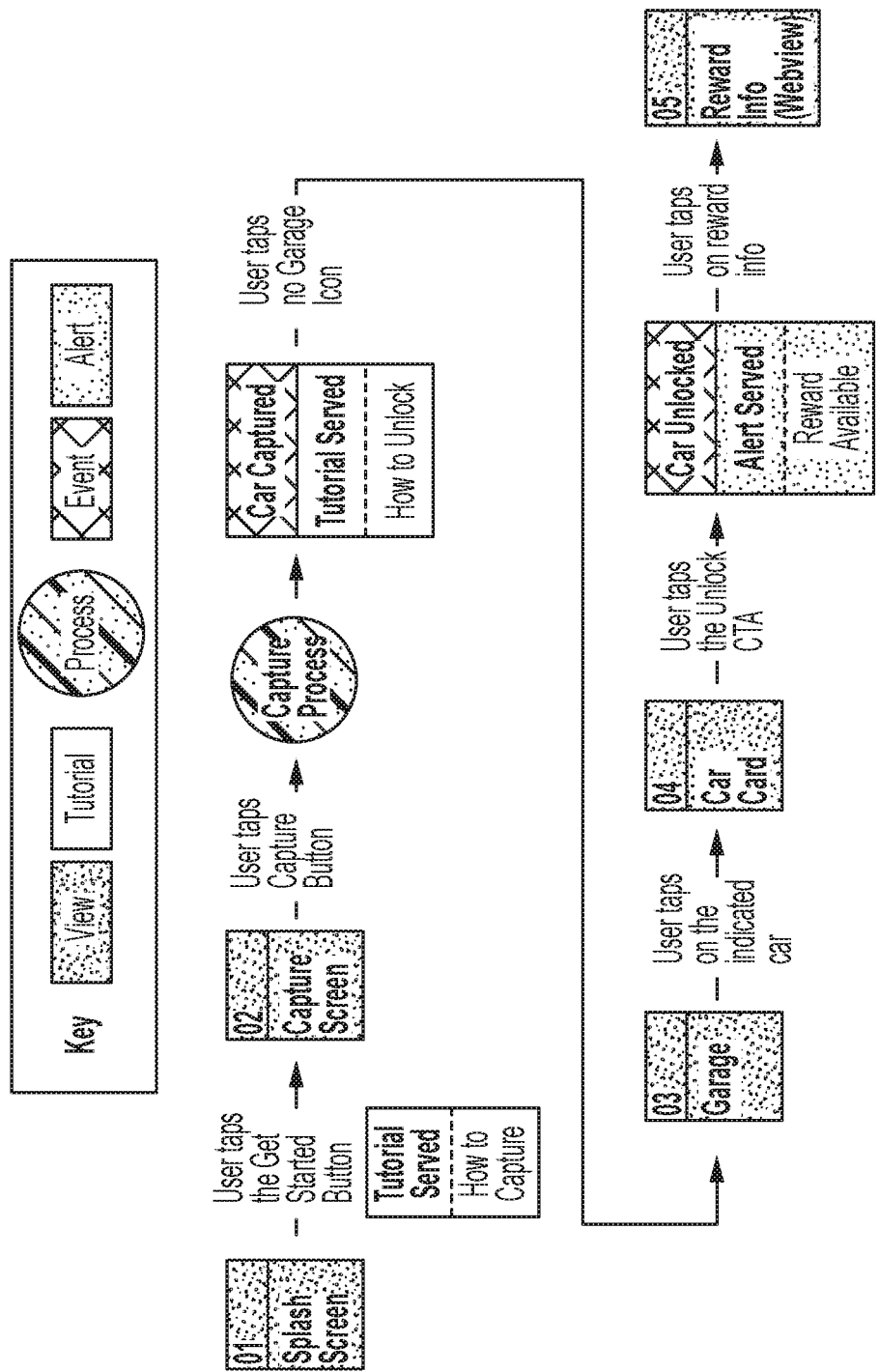
FIG. 2 depicts an illustrative operation of (or user interaction with) the software application in accordance with some embodiments of the present invention.
Figure 3:
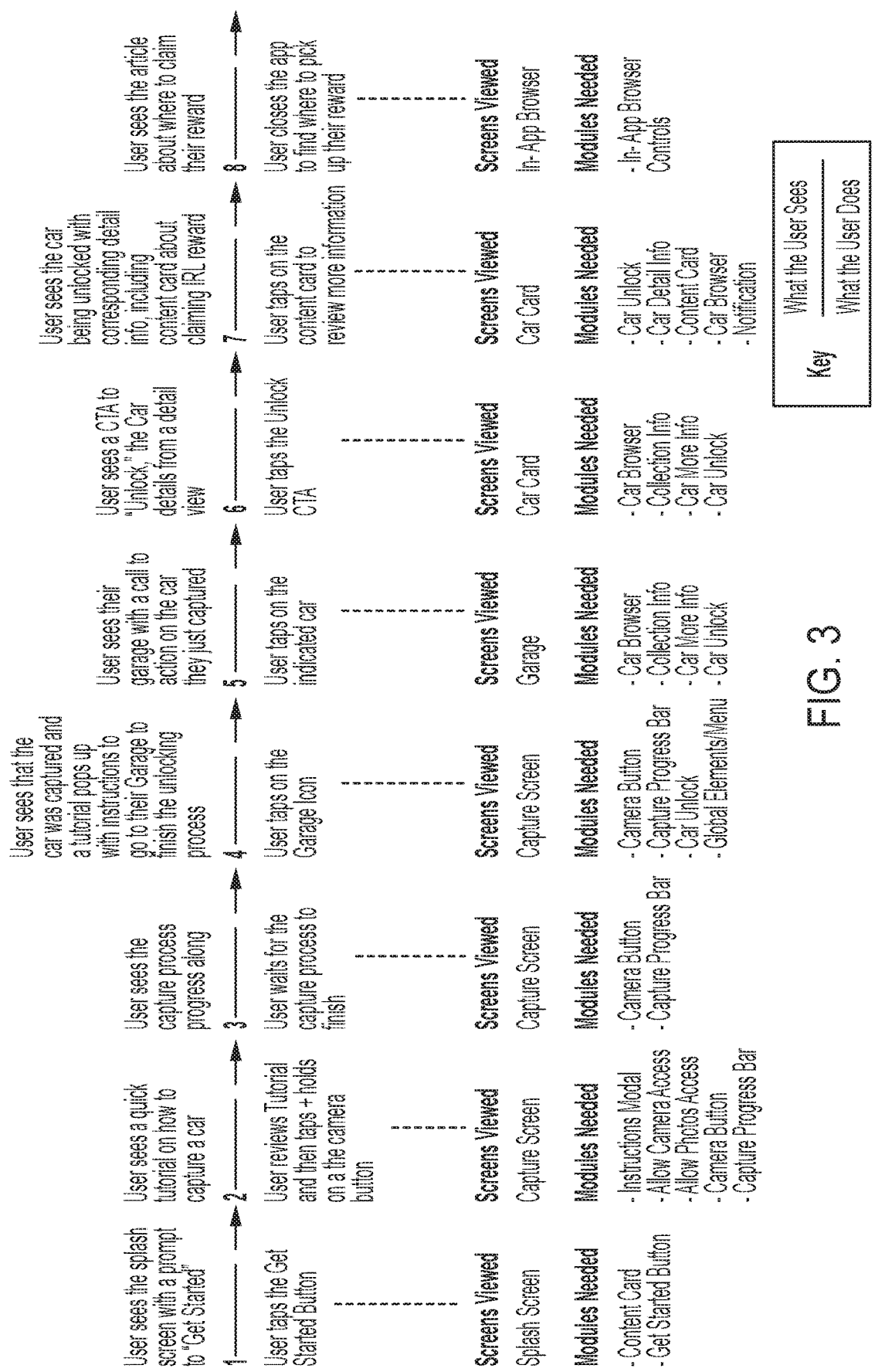
FIG. 3 depicts another illustrative operation of (or user interaction with) the software application in accordance with some embodiments of the present invention.

FIG. 1 depicts part of the user interface of the software application 100. FIGS. 2-3 depict illustrative operations of (or user interaction with) the software application 100 that are understood from the discussion of FIG. 1 below. FIGS. 4-21 depict illustrative screen shots of the software application. The discussion below about the user interface primarily relies on FIG. 1 and will refer to other figures from time to time for better understanding the present invention.

Figure 4:
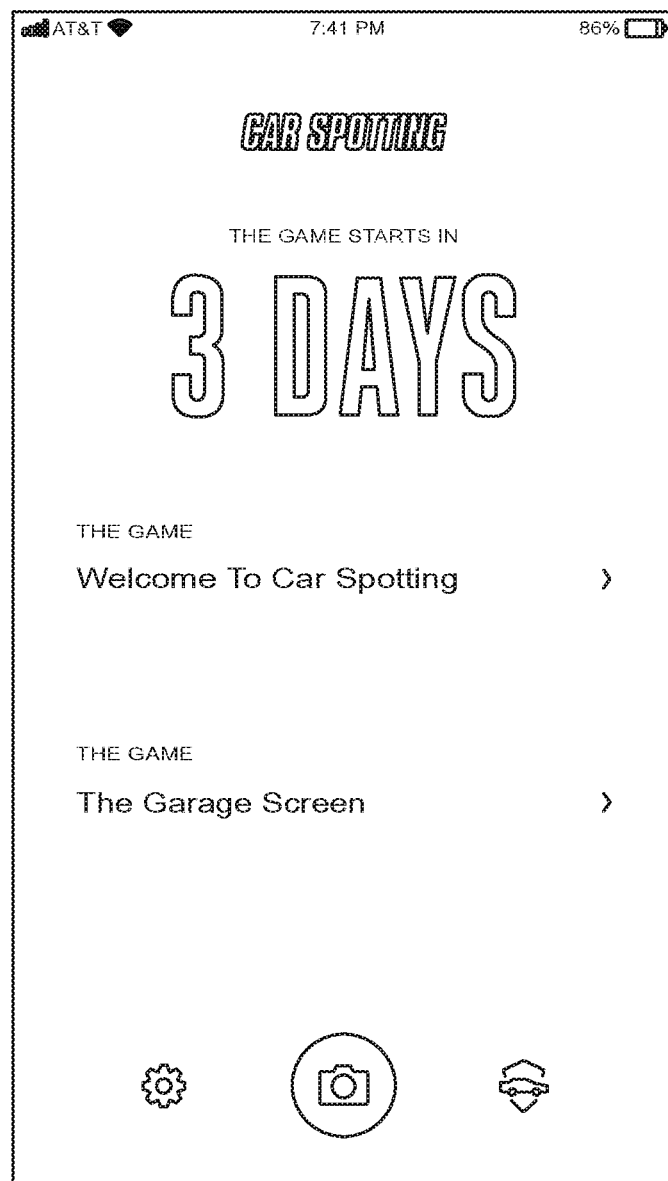
FIG. 4 depicts an illustrative install screen of the software application in accordance with some embodiments of the present invention.
Figure 5:
FIG. 5 depicts an illustrative garage screen of the software application in accordance with some embodiments of the present invention.
Figure 6:
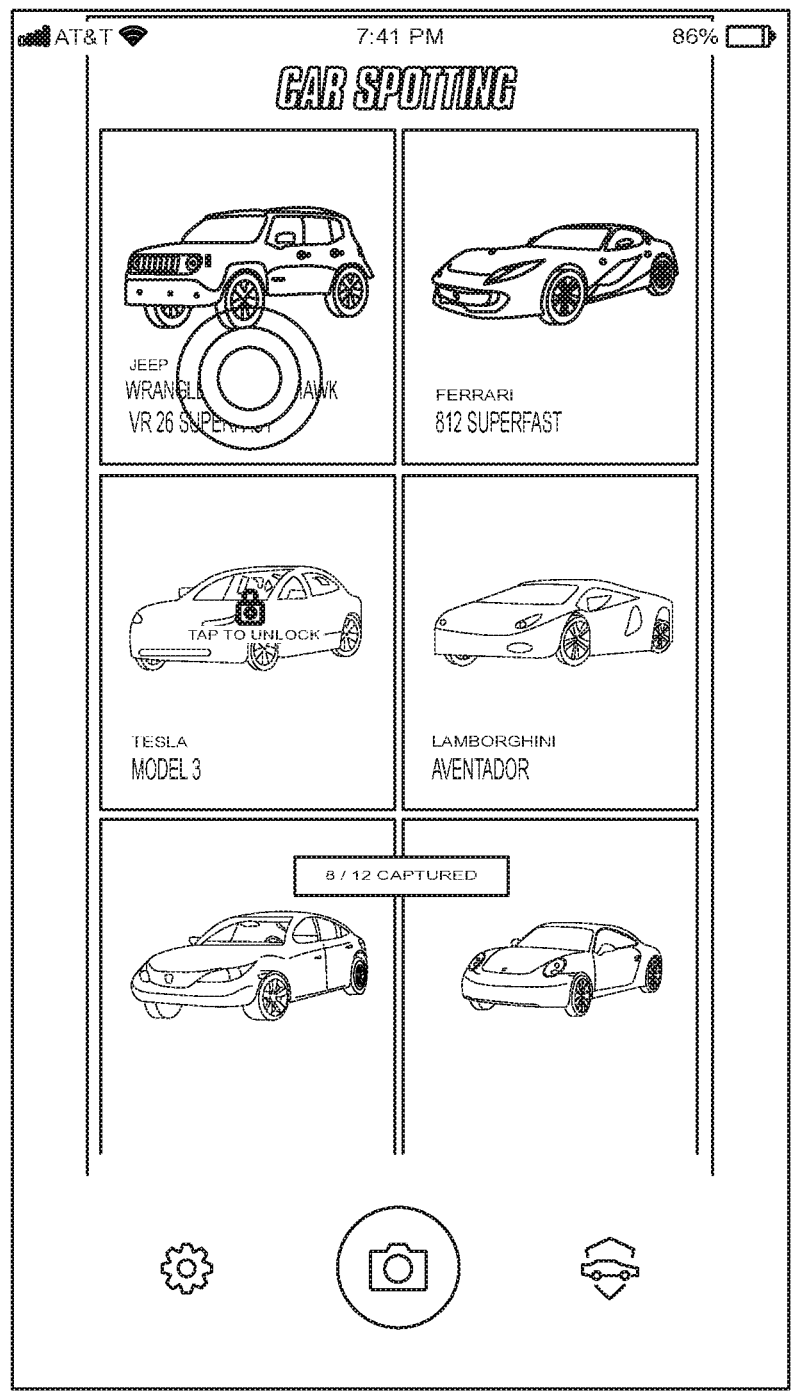
FIG. 6 depicts an illustrative garage screen of the software application showing some vehicles unlocked in accordance with some embodiments of the present invention.
Figure 7:
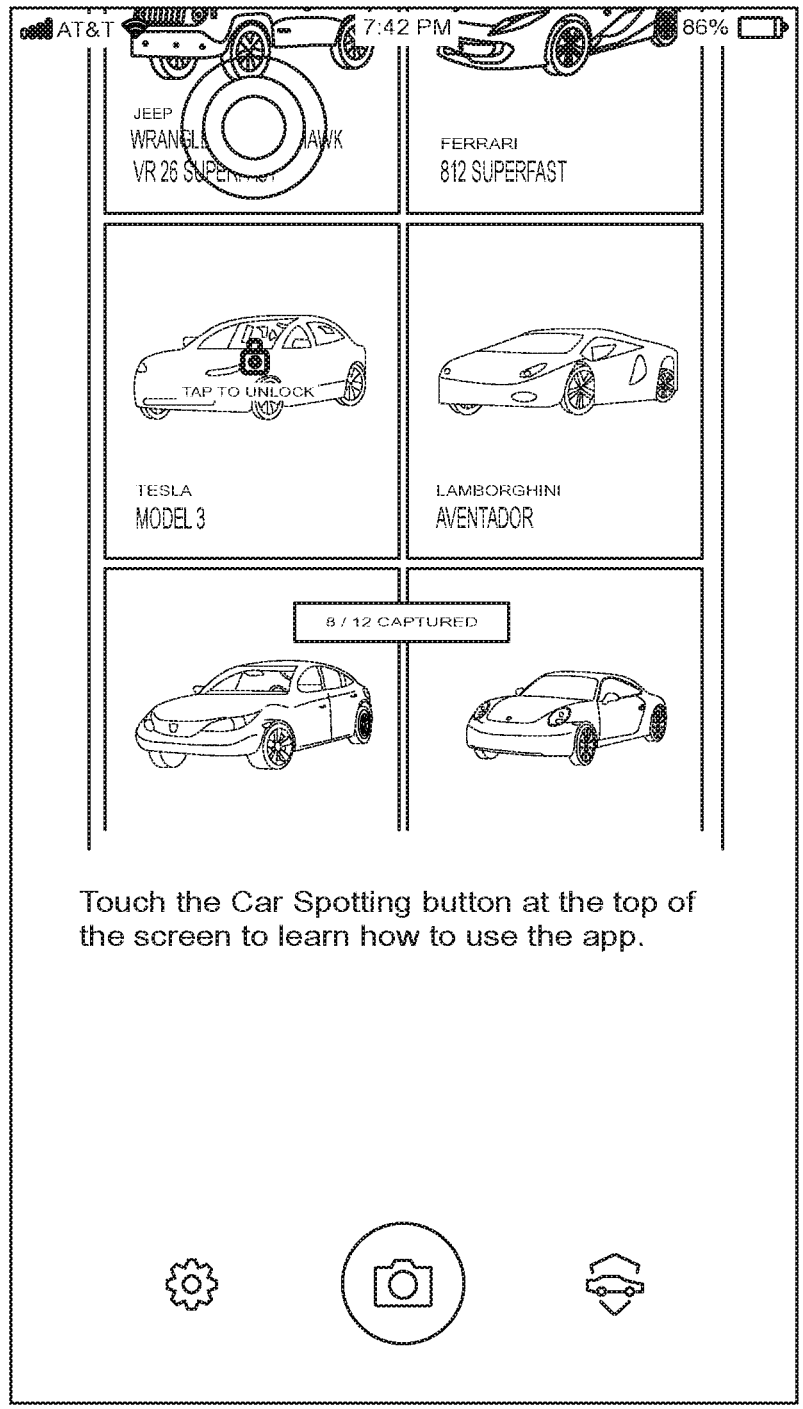
FIG. 7 depicts another illustrative garage screen of the software application showing some vehicles unlocked in accordance with some embodiments of the present invention.
Figure 8:
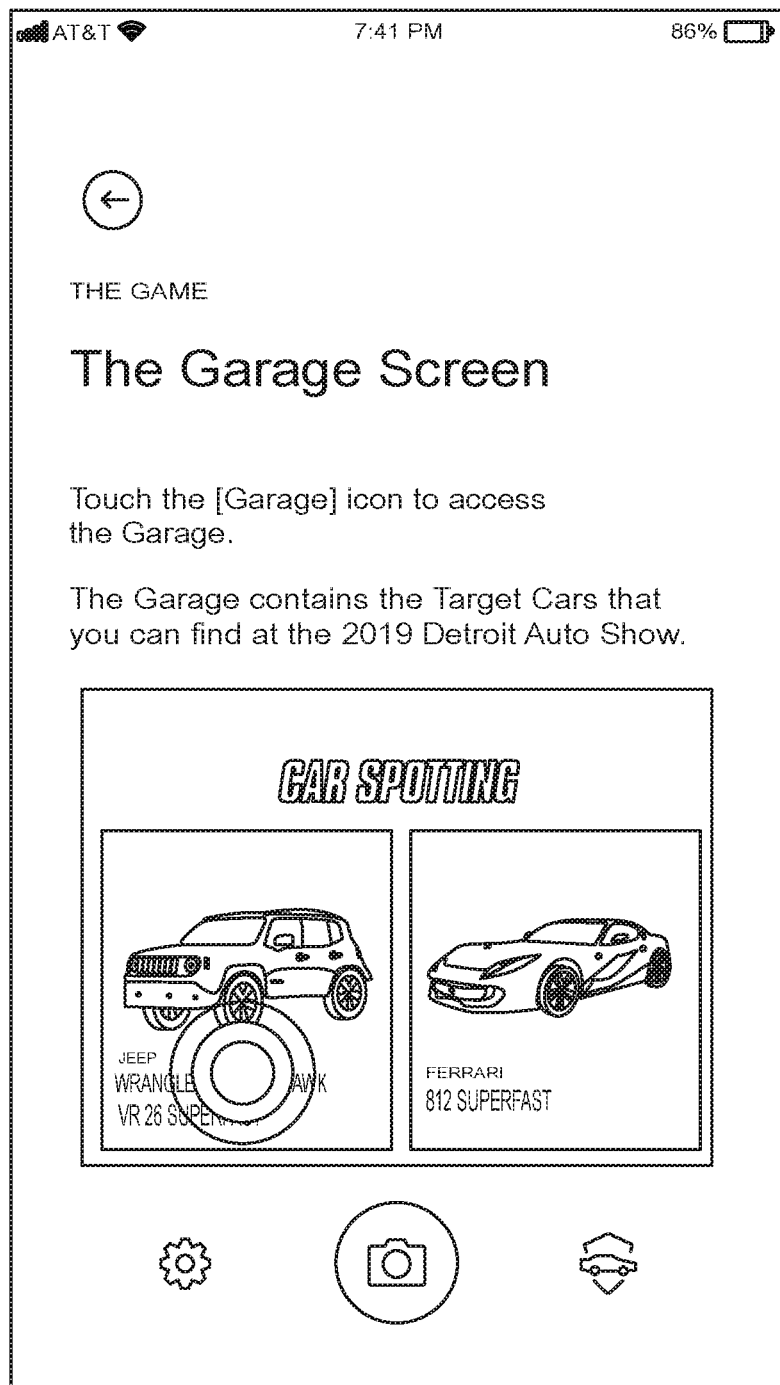
FIG. 8 depicts another illustrative garage screen of the software application in accordance with some embodiments of the present invention.
Figure 9:
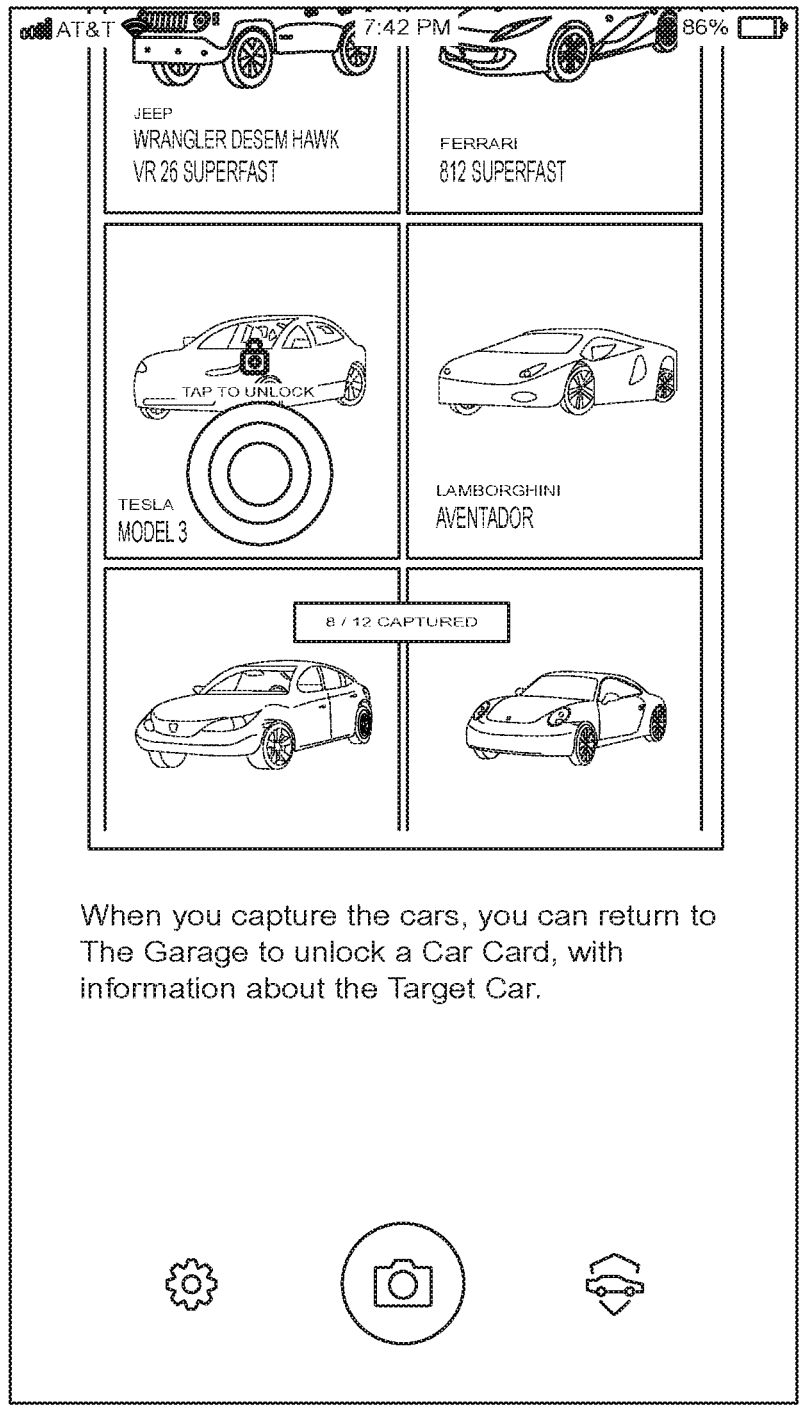
FIG. 9 depicts yet another illustrative garage screen of the software application showing some vehicles unlocked in accordance with some embodiments of the present invention.
Figure 10:
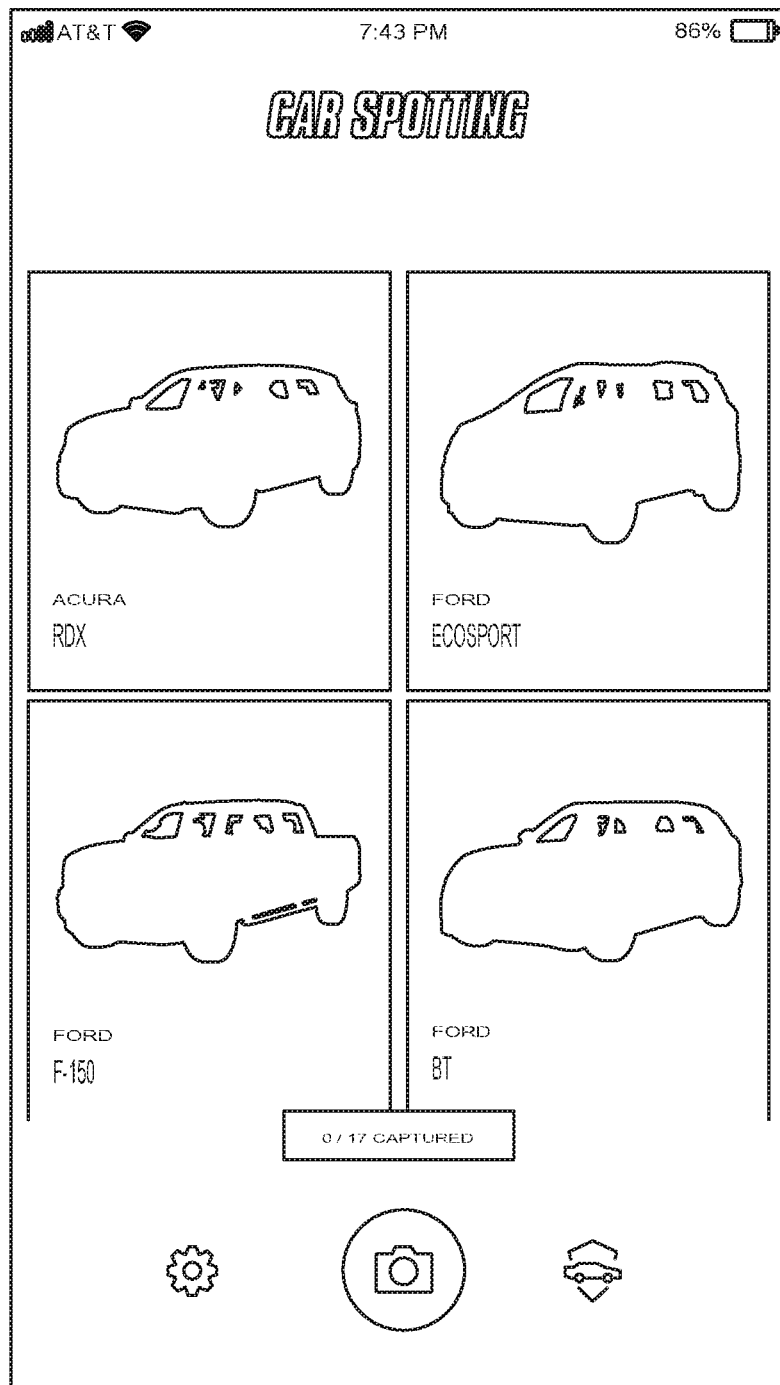
FIG. 10 depicts yet another illustrative garage screen of the software application in accordance with some embodiments of the present invention.

After the software application is selected by the user (e.g., by pressing an icon of the software application displayed on the screen of the handheld mobile device), the computing device loads the software application and the software application presents a splash or landing screen 105 (main or first screen 105) including one or more commands for user selection. FIG. 4 depicts an illustrative first screen 105. The commands, for example, include a garage command 115, a camera command 120, and a settings command 125. The user can select the garage command 115 to view all the vehicles to be unlocked by the user. Selection of the garage command 115 causes the software application to display screen 110 in which all the vehicles to be unlocked are shown. FIGS. 5, 8, and 10 depict an illustrative garage screen 110. FIGS. 6, 7, and 9 depict an illustrative garage screen 110 showing some vehicles unlocked. Screen 110 includes a command 150 for each vehicle to be unlocked and configured for selecting that particular vehicle. The command 150 may include a status indicator showing whether the vehicle (the vehicle associated with the command) is locked or unlocked. For example, the indicator may be presented in the form of color (e.g., with the command shown in black and white to indicate that the vehicle is locked and with the command shown in color to indicate that the vehicle is unlocked) or text (having the command displaying either "locked" or "unlocked"). For example, referring to FIG. 10, the square box associated with Acura RDX is a command 150. That command is shown in black and white because that vehicle has not been unlocked.

Figure 11:
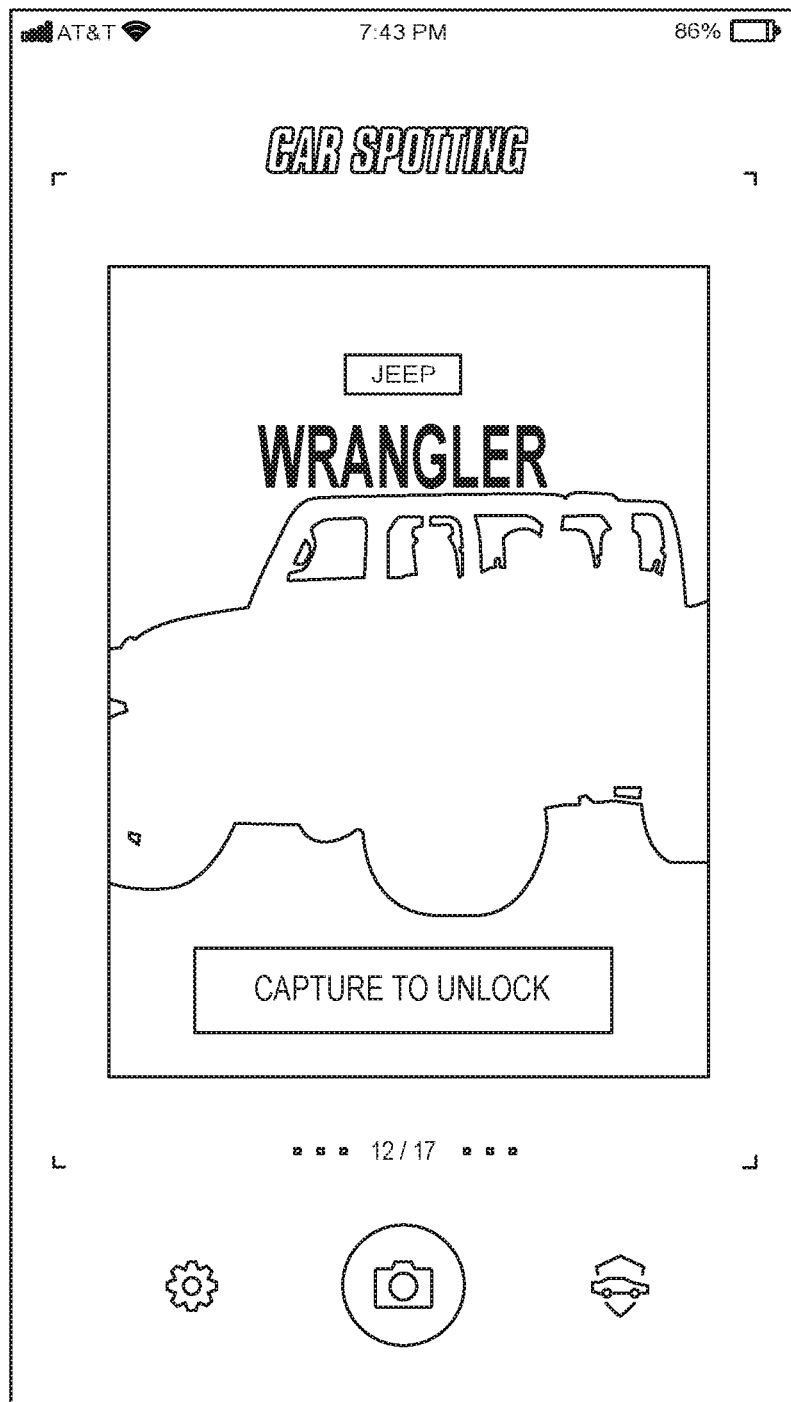
FIG. 11 depicts an illustrative car card of an locked vehicle after selecting the corresponding commands in accordance with some embodiments of the present invention.
Figure 12:
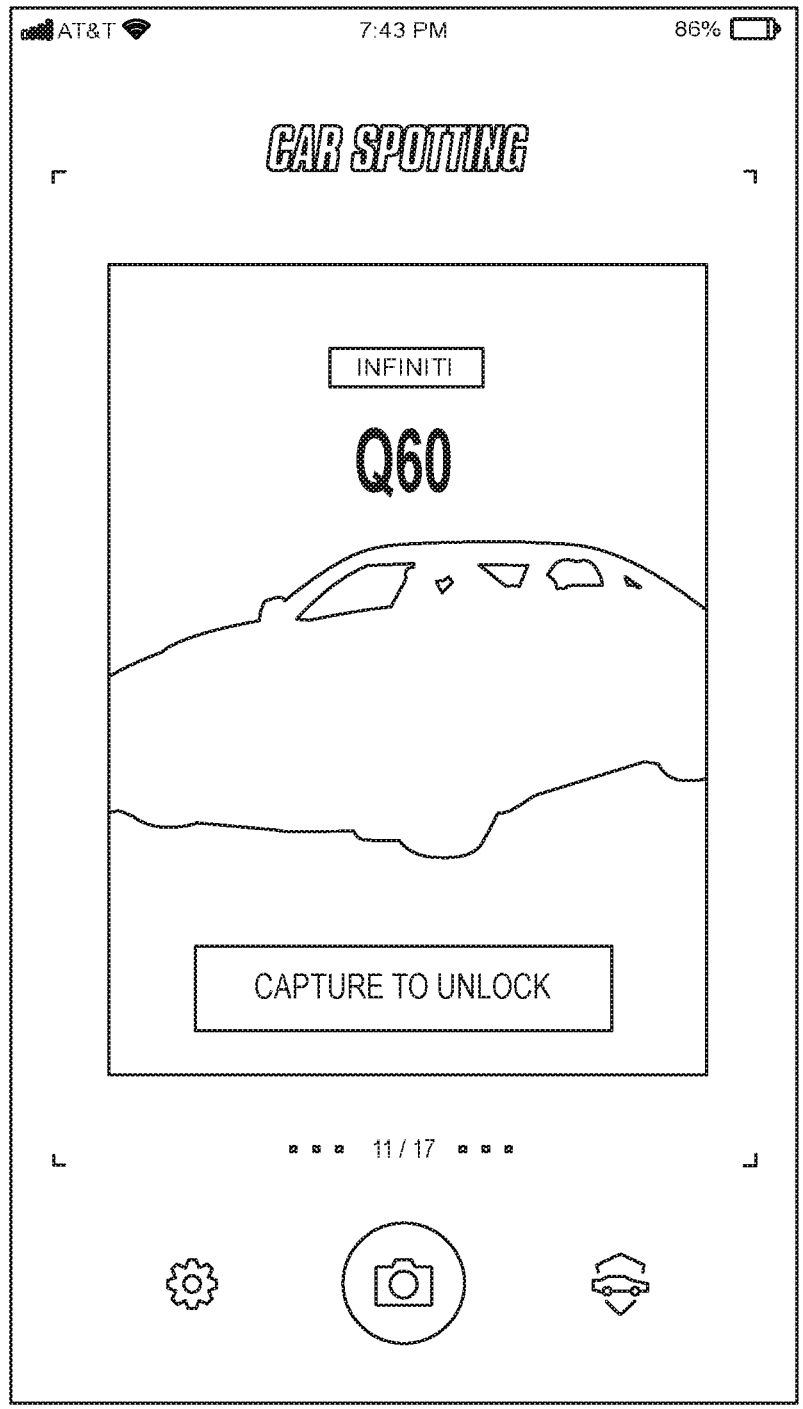
FIG. 12 depicts another illustrative car card of another locked vehicle after selecting the corresponding commands in accordance with some embodiments of the present invention.
Figure 13:
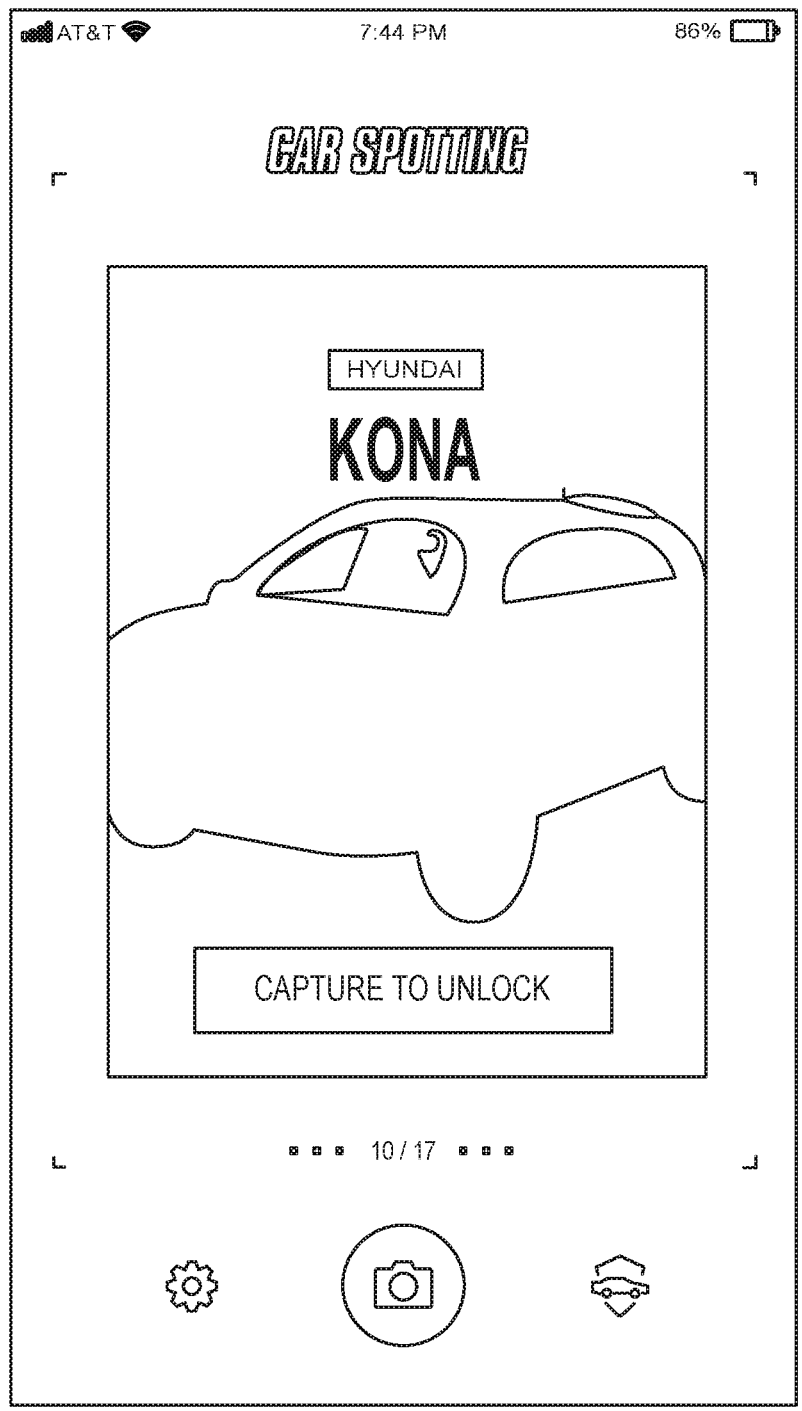
FIG. 13 depicts yet another illustrative car card of yet another locked vehicle after selecting the corresponding commands in accordance with some embodiments of the present invention.

Selection of the command 150 causes the software application to display a screen such as screen 127 or a "car card" 127 showing information about the selected vehicle. When the user selects a vehicle that has yet to be unlocked (locked vehicle), the selection causes the software application to display car card 127 showing vehicle identification information and lock status indicator of the selected vehicle (e.g., vehicle A). Vehicle identification information may contain only the name of the manufacturer (e.g., Infiniti) and the model of the vehicle (e.g., Q60). The lock status indicator may have the image of the selected vehicle (e.g., an image pre-stored in the database) displayed in black and white. The vehicle identification information, lock status indicator, and image of the vehicle may be the information on car card 127. In this example, vehicle A is assumed to be a locked vehicle. FIGS. 11-13 depict illustrative car cards 127 of locked vehicles after selecting their corresponding commands 150.

When the user selects a vehicle that has been unlocked (unlocked vehicle), the selection causes the software application to display a first car screen 130 or car card 130 showing vehicle identification information and lock status indicator of the selected vehicle (e.g., vehicle B). Vehicle identification information may contain only the name of the manufacturer (e.g., Jeep) and the model of the vehicle (e.g., Wrangler). The lock status indicator may have the image of the selected vehicle displayed in color. Car card 130 of an unlocked vehicle is provided with a command 131 configured to access a second car screen 133 or content card 133. Content card 133 includes additional information about the selected vehicle. Additional information may include a description of the selected vehicle (e.g., best SUV of the year, suitable for off-road terrains, etc.) and technical and other information of the selected vehicle (e.g., horse power, torque, time required from 0 to 60 MPH, starting price, etc.). Content card 133 is provided with a command 134 configured to return the garage screen 110 to car card 130. Car card of a locked vehicle such as 127 is configured without such a command 131. The software application may include additional car cards for other vehicles shown in garage screen 110 (e.g., car card 135 for vehicle C).

The vehicles to be unlocked and the car cards and content cards of those vehicles (and the information on those cards) are stored in a database of the software application and can be accessed and displayed by the software application on the garage screen. Car card and content card may contain information about the vehicle such as an image of the vehicle (e.g., an image pre-stored in the database), the manufacturer of the vehicle (e.g., Ford), the model number or name of the vehicle (e.g., Mustang), the year in which the vehicle is made or to be debuted (e.g., 2022), and other information (e.g., horsepower, engine size, torque, chassis dimensions, time required from 0 to 60 MPH, starting price, etc.) about the vehicle. For example, a car card may contain an image of the vehicle, the manufacturer of the vehicle, the model number or name of the vehicle, the year in which the vehicle is made or to be debuted, whereas a content card may contain other information such as horsepower, engine size, torque, chassis dimensions, time required from 0 to 60 MPH, starting price, etc.

The database in general is inaccessible to the user (or the user has limited access) and is accessible only by the software application. The user can access the database or the cards in the database only when he unlocks a vehicle. Before the user unlocks a vehicle, the user has limited access to the database such as the car cards or commands shown in FIGS. 11-13 or the information on those cards or commands. After the user unlocks the vehicle, the software application accesses the database and retrieves the corresponding cards (e.g., car card and content card). Car card and content card of the unlocked vehicle are made available to the user and the user can view the cards or information in the cards immediately after he unlocks the vehicle and at a later time (e.g., when the he accesses or logs into the software application the next time). Cards of the other vehicles (locked vehicles) remain inaccessible to the user until they are unlocked by the user. Information about which vehicles have been unlocked and are still locked are tracked and stored by the software application. This information may be used by the software application to determine the appropriate prizes based on the user's vehicle unlocking progress or his final unlock result.

The software application is configured without an option allowing the user to directly access the database, e.g., without a database command that permits the user to view all the car cards and content cards directly. The software application may be configured to have a developer option that allows developers of the software application to access the database. In some embodiments, such option or access can be authorized by the developers to the users in some situations, such as the user and the developer, or the entity for which the software application is made for, have subscription service and the developer, or entity, may allow the user to pre-unlock one or more vehicles before or during the contest. The database or the cards in the database are accessible through the garage screen 110 and the user may not be able to avoid or skip the garage screen 110 in order to reach the database. The garage screen serves as a control interface or gatekeeper between the user and the database. The cards are available only through commands 150 in the garage screen 110. For example, one of the commands 150 provides access to car card 127 only when vehicle A is locked (not content card of vehicle A) and another one of the commands 150 provides access to both car card 130 and content card 131 after vehicle B is unlocked.

FIG. 1 shows that three (3) car cards in the database and the user can select one of the cards for viewing vehicle information (e.g., vehicle identification information, lock status, and image of the selected vehicle) about that vehicle from the garage screen 110. For example, the user may select vehicle B from the garage screen 110, and the software application then retrieves car card 130 of vehicle B from the database and displays that card on the garage screen 110.

The garage screen 110 is updated according to the user's vehicle unlocking progress. Before any of the vehicles is unlocked, commands 150 on the garage screen 110 have a status indicator showing that they are locked (e.g., the vehicle images in commands 150 are shown in black and white). When a vehicle is unlocked, the status indicator of that vehicle or command is changed to show that it has been unlocked (e.g., the vehicle image in the corresponding command is changed to color).

The car card and content card, in operation, may be shown as one card on the garage screen 110. The car card may be shown as the front of the card whereas the content card may be shown as the back of the card. The software application displays the car card first when the command 150 is selected, and then the content card when the command 131 is selected (if the vehicle is unlocked). The software application may show the content card by turning over the card (the car card), revealing the back side of the car card, to make the cards appearing as one card.

The camera command 120 (FIG. 1) is configured to turn on the camera of the computing device. Upon selecting the camera command 120, the software application displays the view of the camera or a capturing screen 140 on the display of the computing device. The user can direct the view or capturing screen 140 to a vehicle in the auto show and the software application, through the object recognition function, can identify the vehicle in the view. The software application through the object recognition function can recognize the vehicle and display the relevant information in real-time or before the user presses the image capturing button (e.g., as the vehicle appears in the viewfinder or on the screen of the computing device such as by the software application displaying text or other indicator over the view of the view screen, splashes an icon or text when the view screen is showing a vehicle and the software application automatically recognizes that vehicle). The object recognition function can also recognize the vehicle and display the relevant information after the user presses the image capturing button (after an image is captured). The user can point the camera at the vehicle in different angles and the object recognition function can recognize the vehicle in different angles. The object recognition function can recognize the vehicle when the entire vehicle or a portion of the vehicle appears in the view of the camera.

After the vehicle is identified, the vehicle is unlocked by the software application. "Unlock" means that both the car card and content card of the vehicle, or information on those cards, are available to the user through the garage screen 110, or through a first car screen (e.g., 130) and a second car screen (e.g., 133) displayed on the garage screen 110. The user can select the command 150 of the unlocked car to access the car card and content card. Before the vehicle is identified, the vehicle is locked by the software application. "Lock" means that both the car card and content card of the vehicle, or information on those cards, are unavailable to the user through the garage screen 110 or other parts of the software application. "Lock" may also mean that only the car card, or only information from that card, is available to the user through the garage screen 110. When the user selects the command 150 of the locked vehicle, the software application may indicate to the user that the vehicle is locked and disallow access to the car card and content card, or indicate to the user that the vehicle is locked and provide access only to the car card and restricts access to the content card.

In response to identifying a vehicle, the software application may communicate with and cause the network interface of the mobile device to communicate with a database, a server, or other computer system over a communications network (e.g., internet). The server may be configured to store the user's unlocking progress that is accessible through a different computing device. As such, the user can access his progress and obtain vehicle information of the unlocked vehicles from a different device. The server may also be configured to store multiple user's unlocking progress, track their progresses, determine the first person to unlock all the target vehicles in a contest or auto show, and communicate to other users/mobile devices when a person unlocks all the target vehicles in the contest or auto show. The server may also be configured to communicate to other users/mobile devices when a person is close to unlocking all the target vehicles (e.g., someone has unlocked 16 out of 17 target vehicles) or is far ahead than other participants (e.g., someone has unlocked 50% of the target vehicles). The server may also notify the host of the contest (or a computer of the host) or a third party prize provider (or a computer of the third party prize provider) when a winner has emerged. The server may be configured to communicate aforementioned information to participants (or their mobile devices), hosts (or their computer systems), and third party prize providers (or their computer systems) when a user identifies a vehicle using the software application (e.g., the server communicates that someone has unlocked all the target vehicles only when someone has unlocked all the target vehicles using the software application). The server or database may also be configured to communicate other information.

A database storing prize information may be implemented in the software application, or on a different software application or computing device that the software application can communicate with over a communications network to obtain prize information. The prize information database, by default, may be configured to be locked by the software application. Accessibility to the database will require the user to use the software application to identify target vehicles and identify a certain vehicle or a certain number of vehicles. The software application tracks the user's progress and unlocks the corresponding prize based on the user's progress. When the user reaches a certain progress, the database is unlocked and the software application can access the corresponding/unlocked prize information based on the user's progress. The other prizes remain locked and inaccessible by the software application. The database may store coupon codes, gift card numbers, links to discounted products or services that cannot be otherwise obtained, or other prizes. The software application presents the coupon codes, gift card numbers, and/or links to the user through the screen of the mobile device when the user reaches a certain progress. In some embodiments, upon the user reaches a certain progress, the software application can automatically initiate a web browser or other tools or resources on the mobile device and take the user to where the prizes are (e.g., because the prizes are stored on a different location, software application, computing device). The server mentioned above may communicate with the prize database to provide the applicable prize information to the corresponding user or based on that user's and/or other users' unlocking progress.

The object recognition function can recognize vehicles beyond those presented at the auto show (e.g., the user can point the camera at a random car on the street and the software application can recognize that car), but vehicles recognized outside the auto show are not "unlocked" by the software application, or are not saved and tracked by the software application for determining rewards (unless the vehicles at the auto show are publicly available). The database includes vehicles identifiable by the object recognition function. The identifiable vehicles include vehicles beyond those presented at the auto show and a group of target vehicles that can be found at the auto show. The target vehicles are vehicles that can be unlocked by the software application. In some embodiments, the database may contain only the target vehicles and the object recognition function may be configured to recognize only the target vehicles. Since vehicles introduced in an auto show are generally unique, future, or concept vehicles, the target vehicles may be available only at the auto show. The software application is primarily configured to operate with the auto show event. In addition to recognizing actual vehicles, in some embodiments, the software application may also recognize photographs or printouts containing such vehicles.

Figure 21:
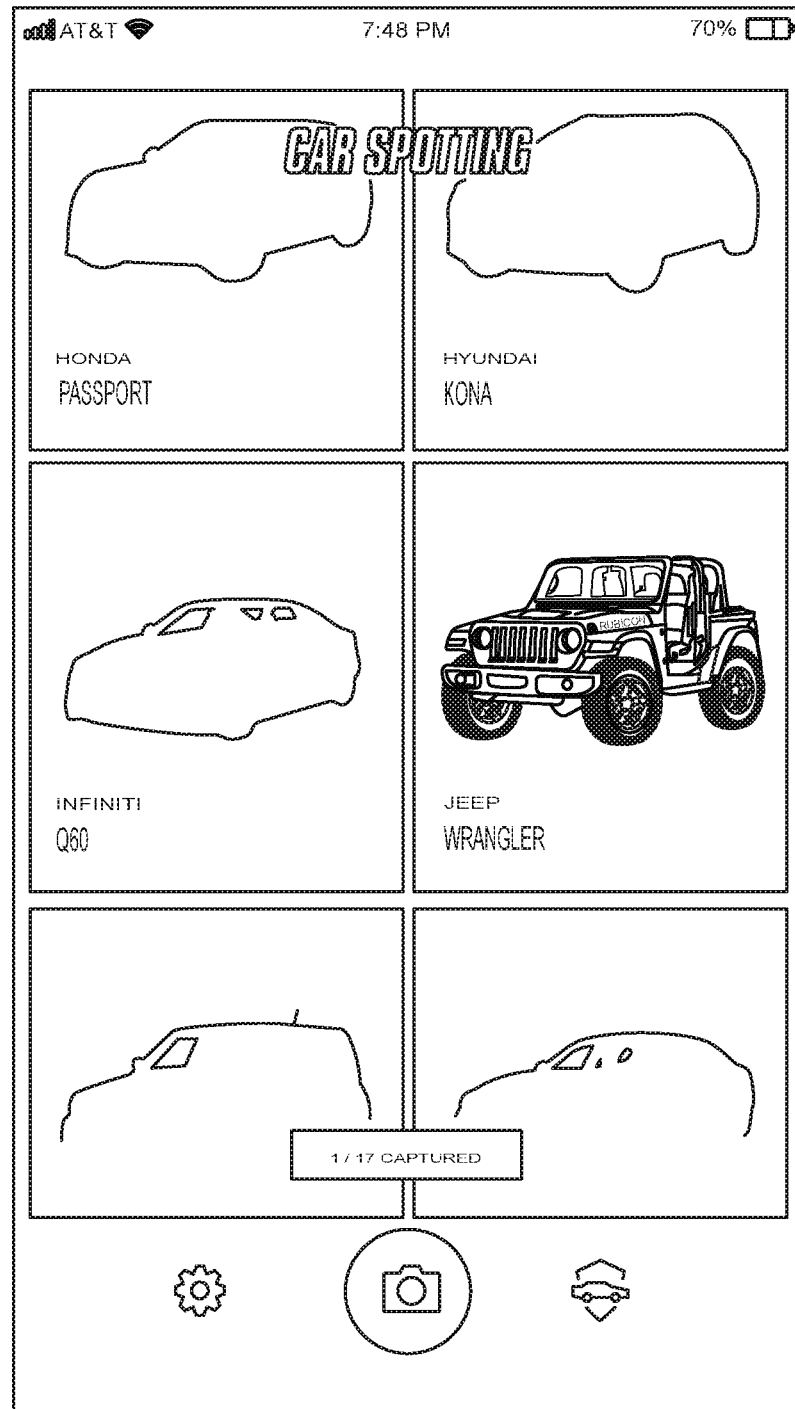
FIG. 21 depicts that a vehicle has been unlocked and the lock status indicator of the command of the vehicle has been changed from one color to another color in accordance with some embodiments of the present invention.

When the user captures a still image of a vehicle in the auto show and the object recognition function recognizes that the vehicle in the image (captured by the camera) is a target vehicle, the software application can communicate to the user that he has captured a target vehicle and requires the user to take additional steps in order to unlock the vehicle. For example, the software application may bring the user to the garage screen, instruct the user to select the command (150) of the vehicle, provide a command requiring the user to press and hold that command for a period of time. After the extra steps, the user then has access to the car card and content card of the target vehicle. FIGS. 16-20 depict these steps and relevant screen shots and cards. FIG. 21 shows that the vehicle (e.g., Jeep Wrangler) has been unlocked and the lock status indicator of the command (150) of that vehicle has been changed from black and white to color. Requiring the user to press and hold the command (FIG. 17) for a period of time may be an operation used by the software application to save and track the user's vehicle unlocking progress in the user's account. The software application may also communicate prize information to the user if applicable, such as when the user unlocks a particular vehicle or unlocks enough vehicles to be eligible for the prize. Prize information may include the prize the user receives for unlocking a particular vehicle or a certain number vehicles.

Figure 14:
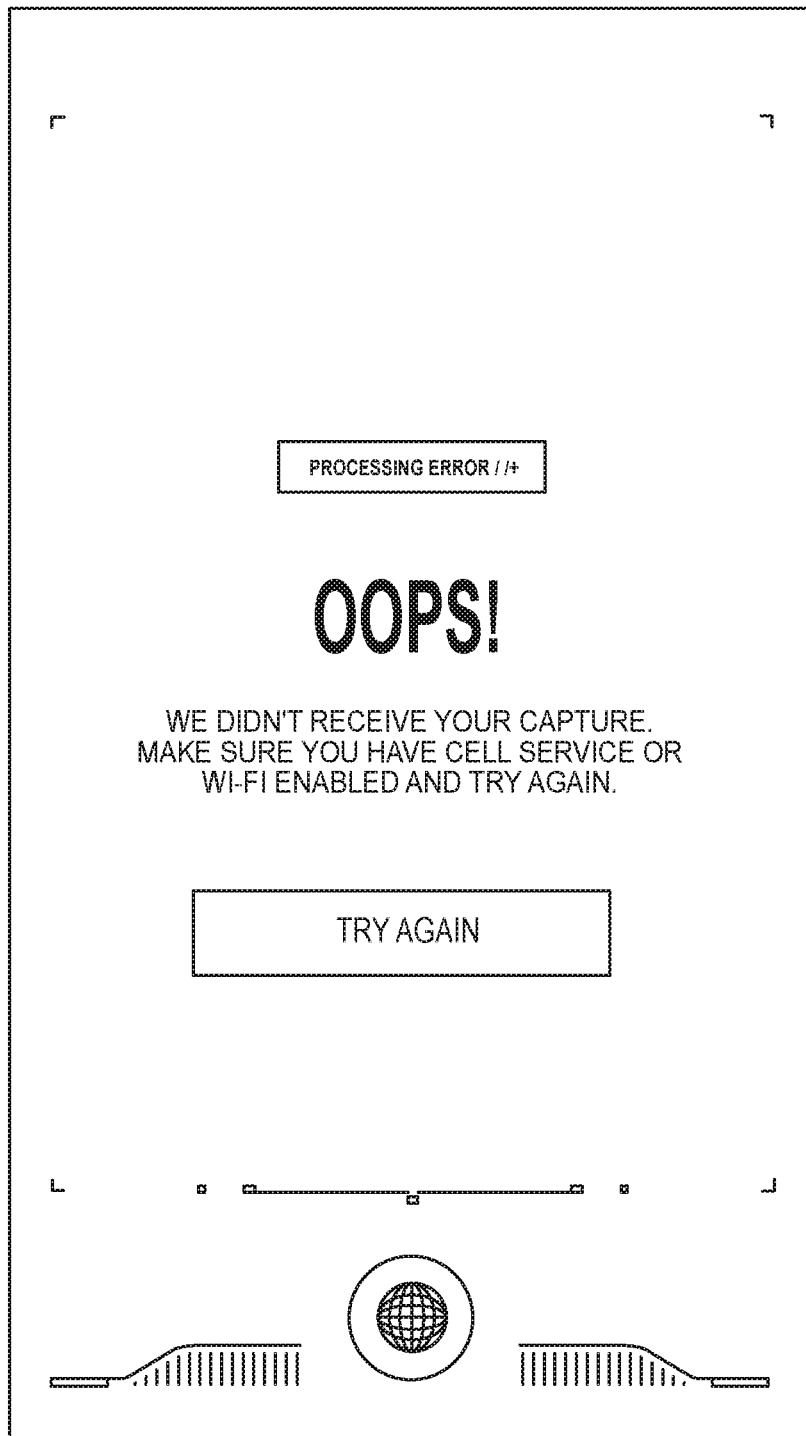
FIG. 14 depicts an illustrative screen showing that the software application did not receive a still image and instructs the user to try again in accordance with some embodiments of the present invention.
Figure 15:
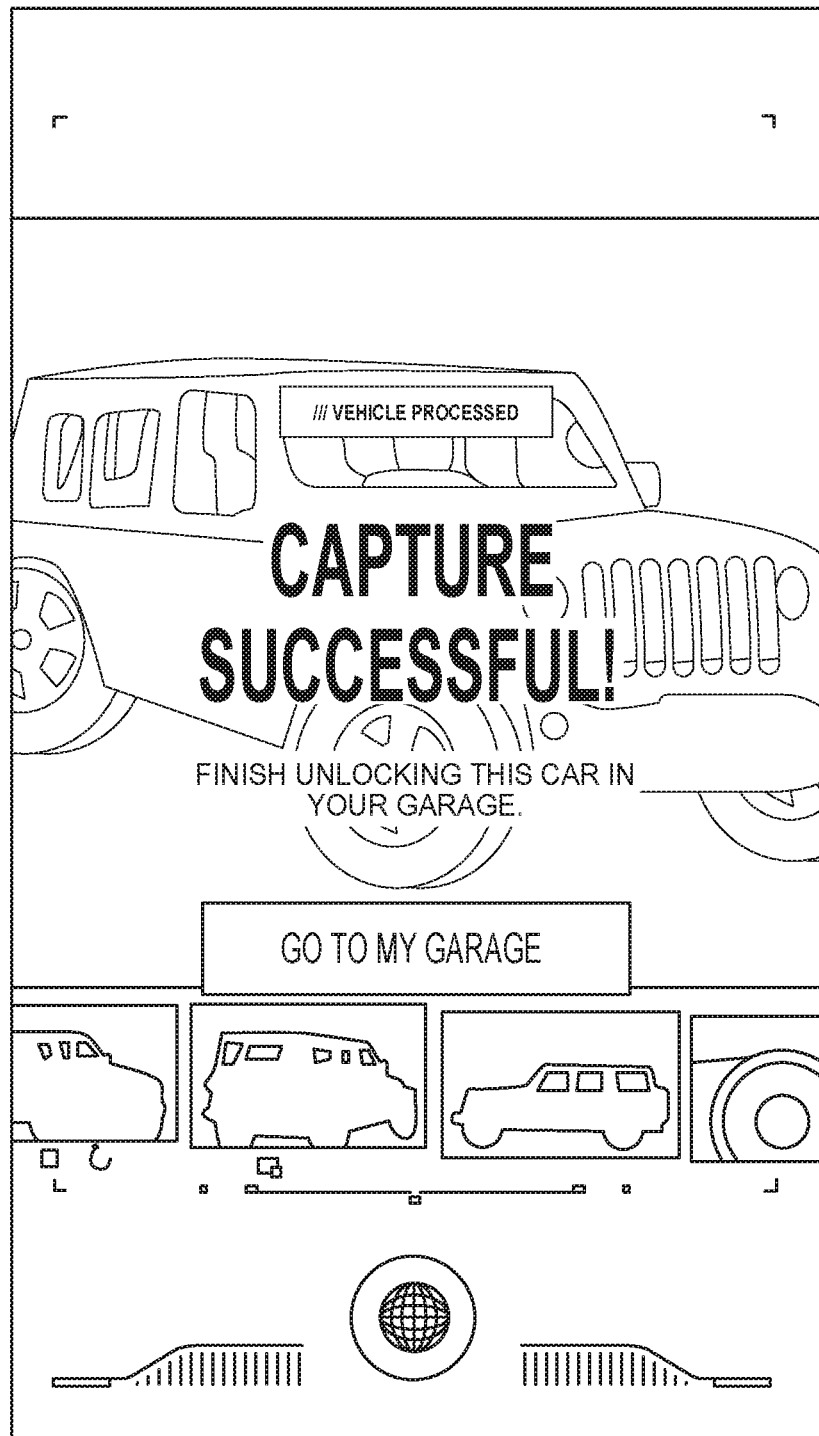
FIG. 15 depicts an illustrative screen showing that the software application successfully receives a still image in accordance with some embodiments of the present invention.
Figure 16:
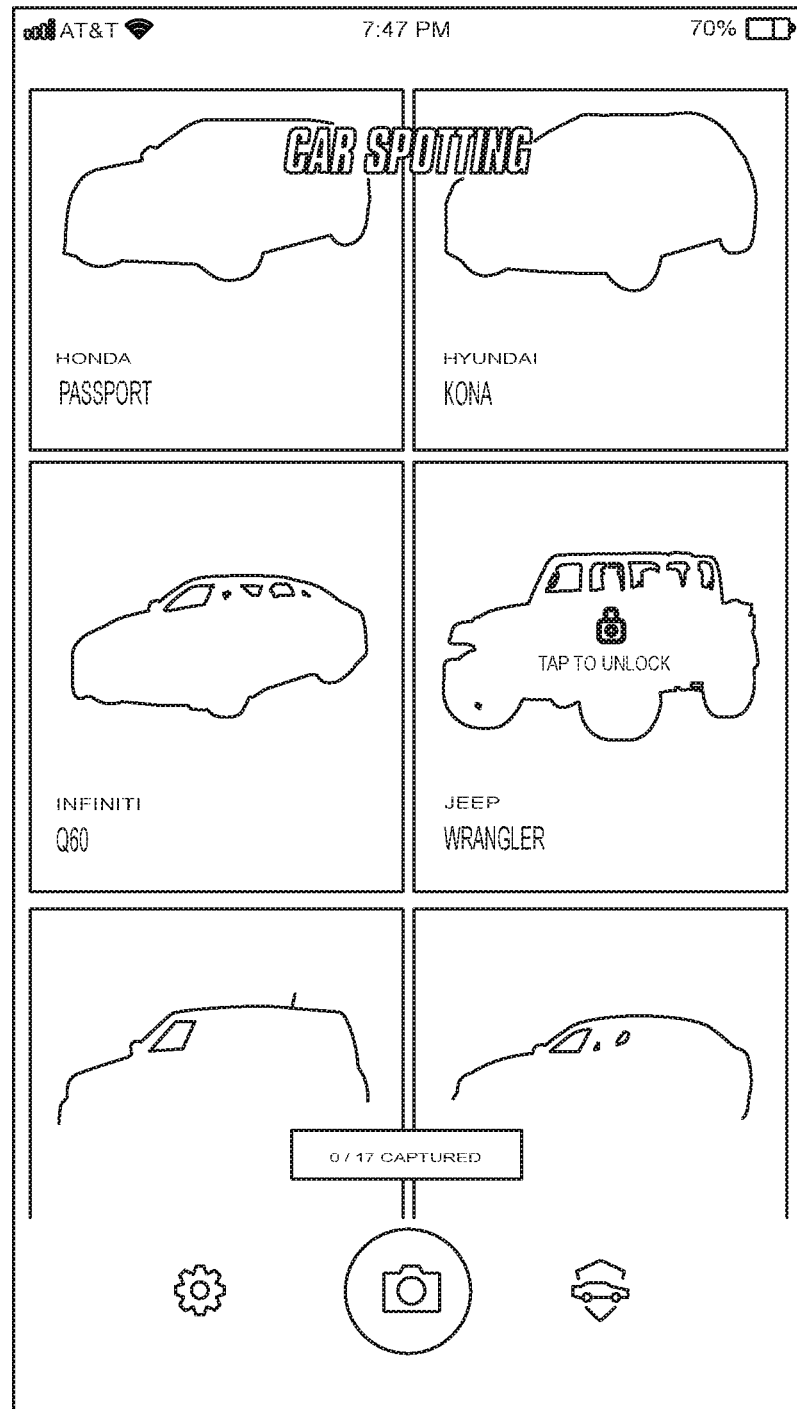
FIG. 16 depicts one of the additional steps that the user may need to take in order to unlock a vehicle in accordance with some embodiments of the present invention.
Figure 17:
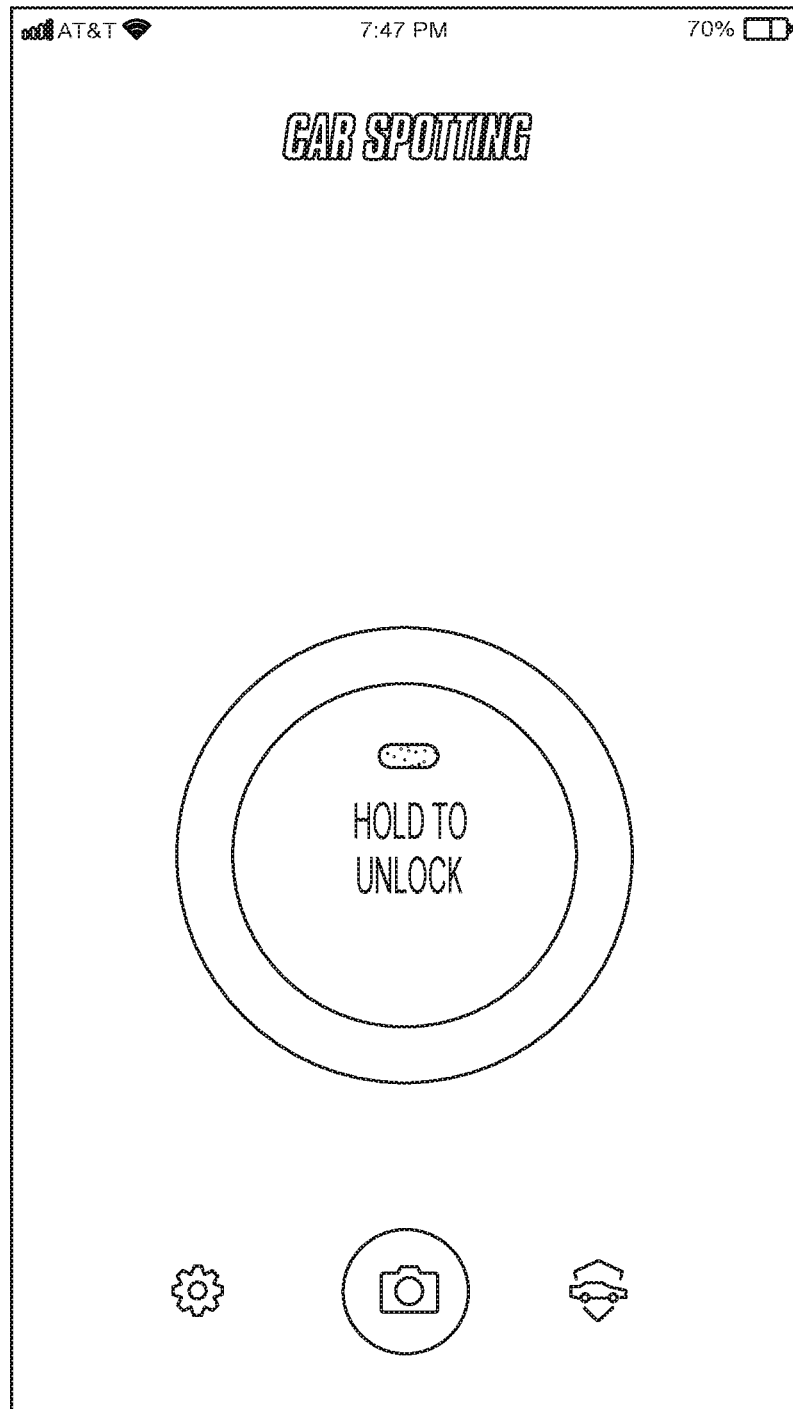
FIG. 17 depicts another one of the additional steps that the user may need to take in order to unlock a vehicle in accordance with some embodiments of the present invention.
Figure 18:
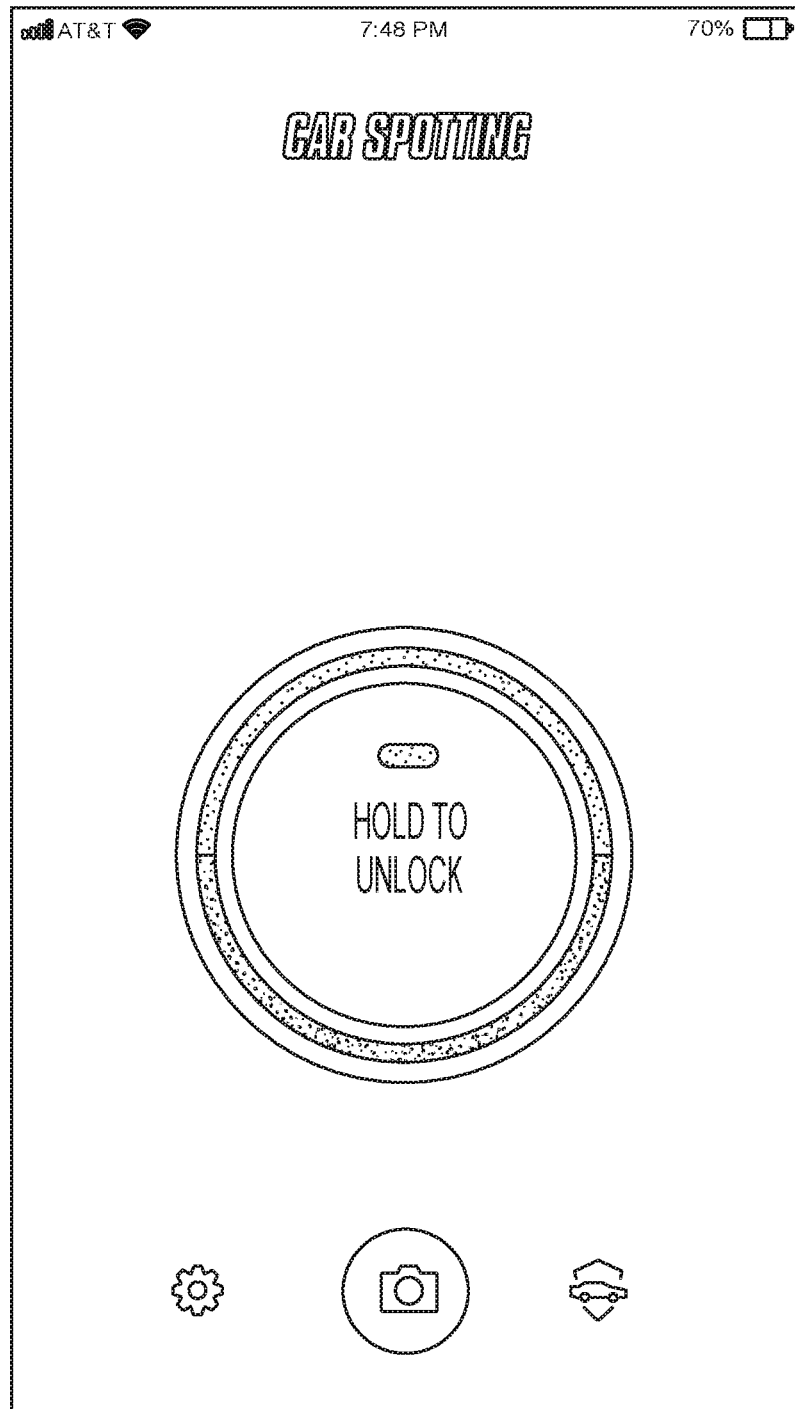
FIG. 18 depicts yet another one of the additional steps that the user may need to take in order to unlock a vehicle in accordance with some embodiments of the present invention.
Figure 19:
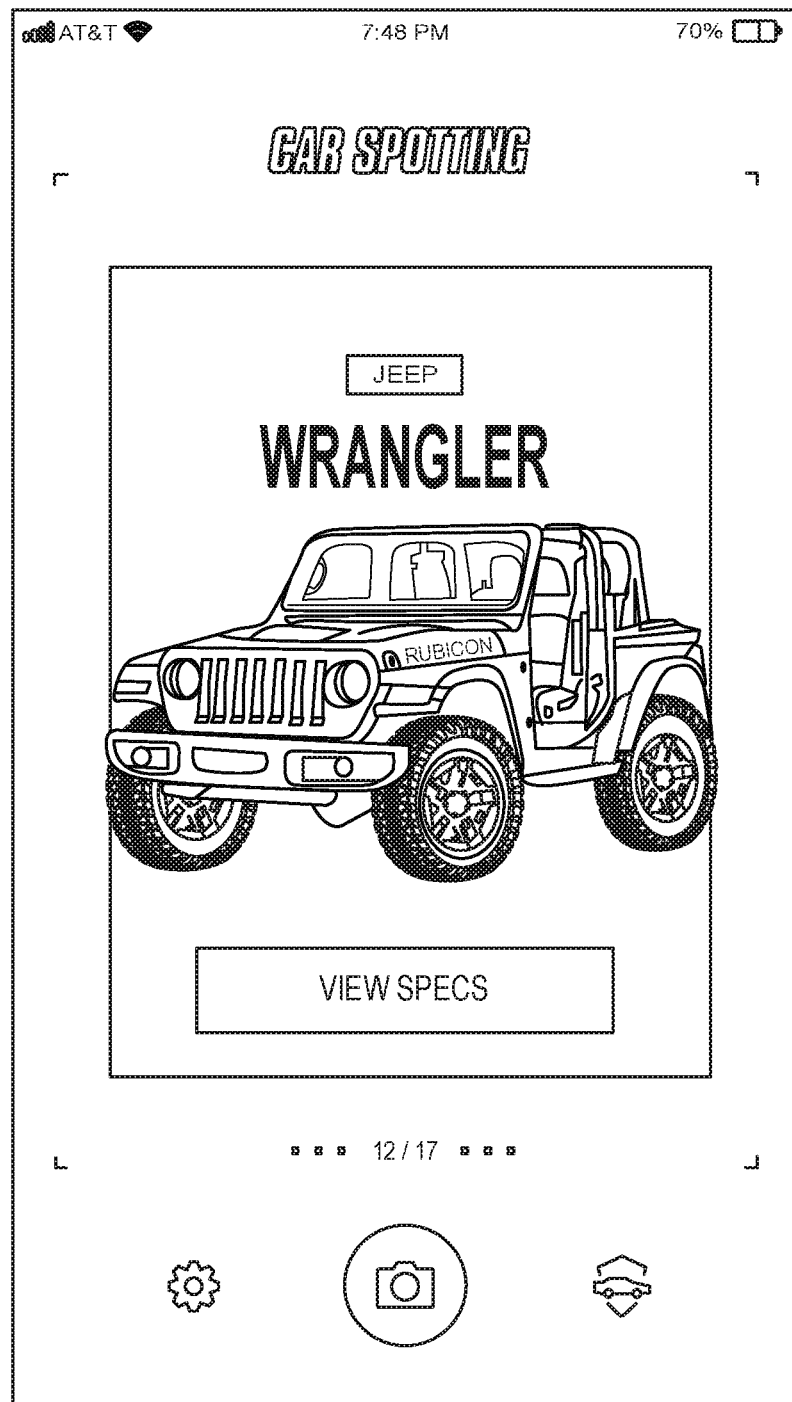
FIG. 19 depicts yet another one of the additional steps that the user may need to take in order to unlock a vehicle in accordance with some embodiments of the present invention.
Figure 20:
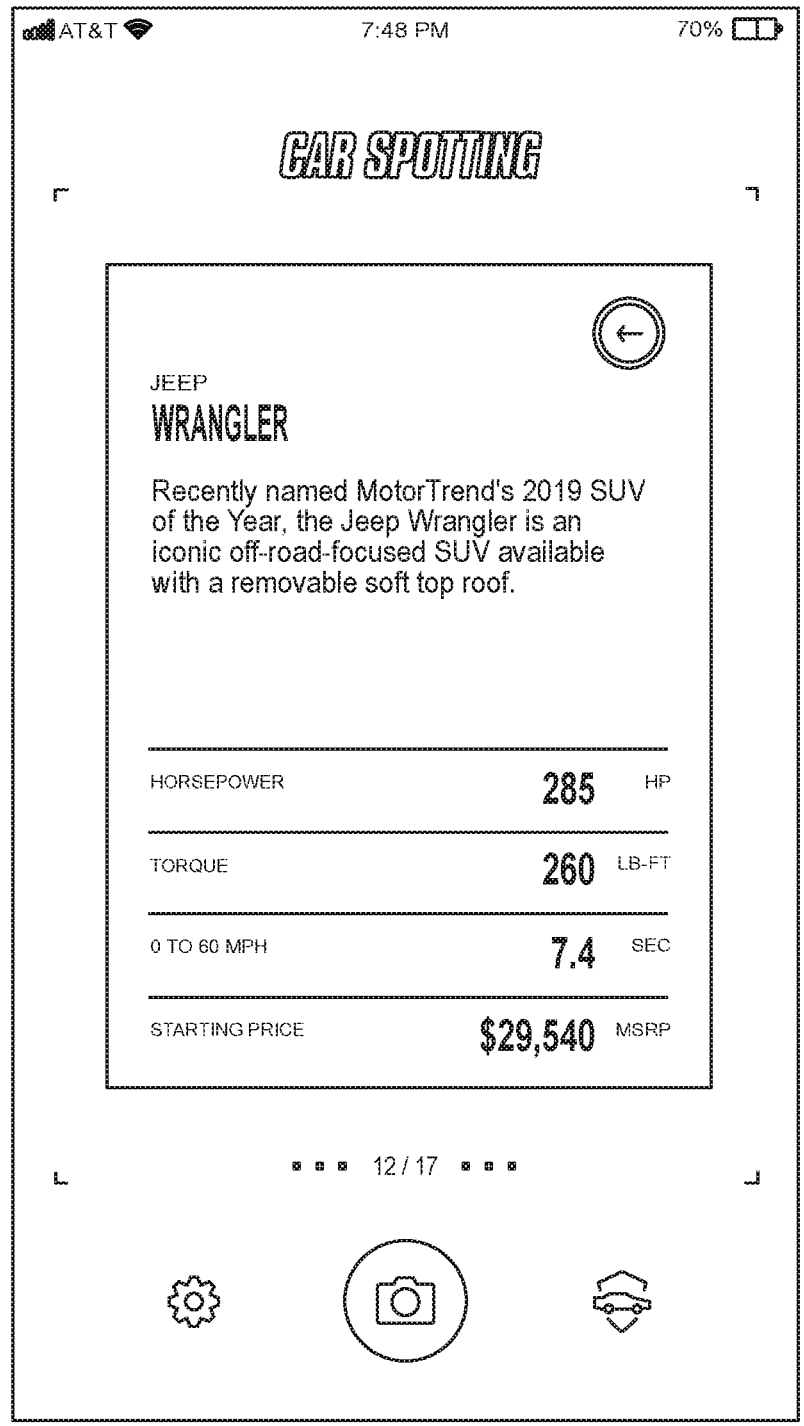
FIG. 20 depicts yet another one of the additional steps that the user may need to take in order to unlock a vehicle in accordance with some embodiments of the present invention.

FIG. 14 depicts an illustrative screen showing that the software application did not receive a still image and instructs the user to try again. FIG. 15 depicts an illustrative screen showing that the software application successfully receives a still image.

The settings command 125 (FIG. 1) is configured to present a settings screen 145 after selection. The settings screen 145 may include one or more commands configured to view information about the auto show (e.g., the name of the auto show, the name of the entity that hosts the auto show, the name of the sponsors, the names of the automobile manufactures participating in the auto show, the total number of cars being displayed, etc.) and to make changes related to the software application (e.g., changing the theme, format, style, or font of the software application) upon selection.

In some embodiments, the screen 105 may be the initial screen of the software application that appears on the display of the computing device after the computing device finishes loading the software application. The initial screen may include the garage command, camera command, and settings command described above. The garage screen 110 may appear in response to the user selecting the garage command in the screen 105. The camera command and settings command may also be available for selection from the garage screen 110 after the garage command on the screen 105 is selected. The camera view or capture screen 140 may appear on the display of the computing device after the user selects the camera command from the initial screen 105. The car card 127, 130, or 135 may appear on the display of the computing device after the user selects a vehicle from the garage screen 110. The settings screen 145 may appear on the display of the computing device after the user selects the settings command from the initial screen 105.

The software application also includes other commands, such as tutorial commands configured to display screens explaining the operation of the software application and the functionalities of the garage and camera commands upon selection, reward commands configured to display screens showing rewards that the user has received based on the user's vehicle unlocking progress. FIGS. 4 and 5 depicts some of these commands. The software application also allows the user to create an account that can be used to save and track the user's vehicle unlocking progress or result.

A command allows the user to interact with the software application. Each user interface includes one or more commands. A command permits the user to select an area in the user interface or screen of the computing device (e.g., by pressing his finger on the area or screen) to instruct the software application to further display additional information or perform additional functions. For example, a command can be a button, window, icon, button, and the like. A command can also be selected through voice, audio, gestures, or other manners.

Figure 22A:
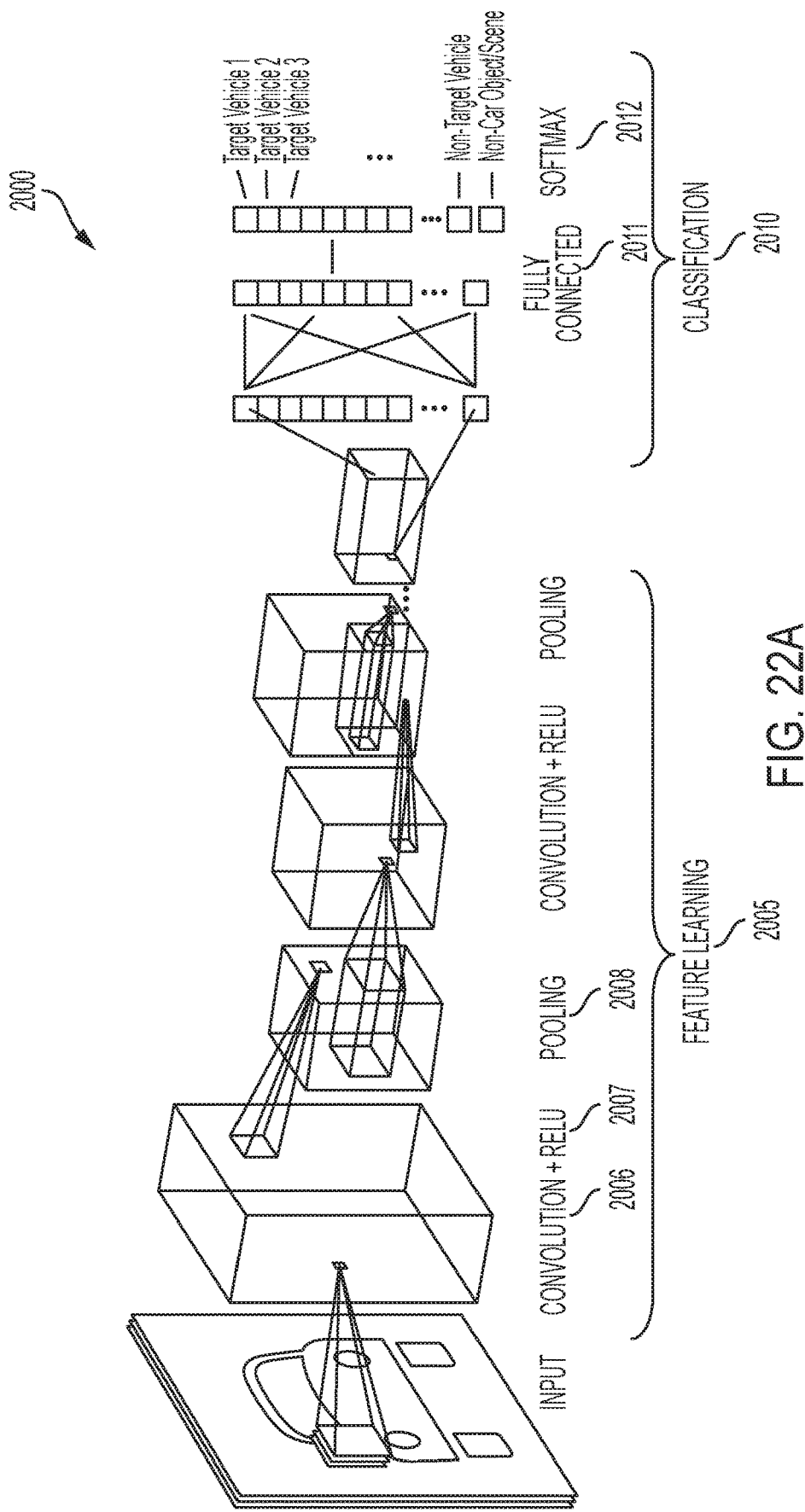
FIG. 22A depicts a detailed view of an illustrative machine learning system in accordance with some embodiments of the present invention.

The object recognition function is implemented on a machine learning system. In one embodiment, as shown in FIG. 22A, the machine learning system 2000 includes a first artificial neural network (feature learning component) 2005 and a second artificial neural network (image classification component) 2010. The first neural network 2005 is configured to receive a lower resolution image of the image or frame captured by the camera, detect features in the lower resolution image (e.g., patterns, edges, shapes, colors, and other characteristics that are used to delineate an object in the image), and compute a vector representing the detected features. The image is captured by the camera in original resolution or a first resolution. In some embodiments, the original resolution image may also be used without being processed to reduce its resolution (use as-is).

Figure 23:
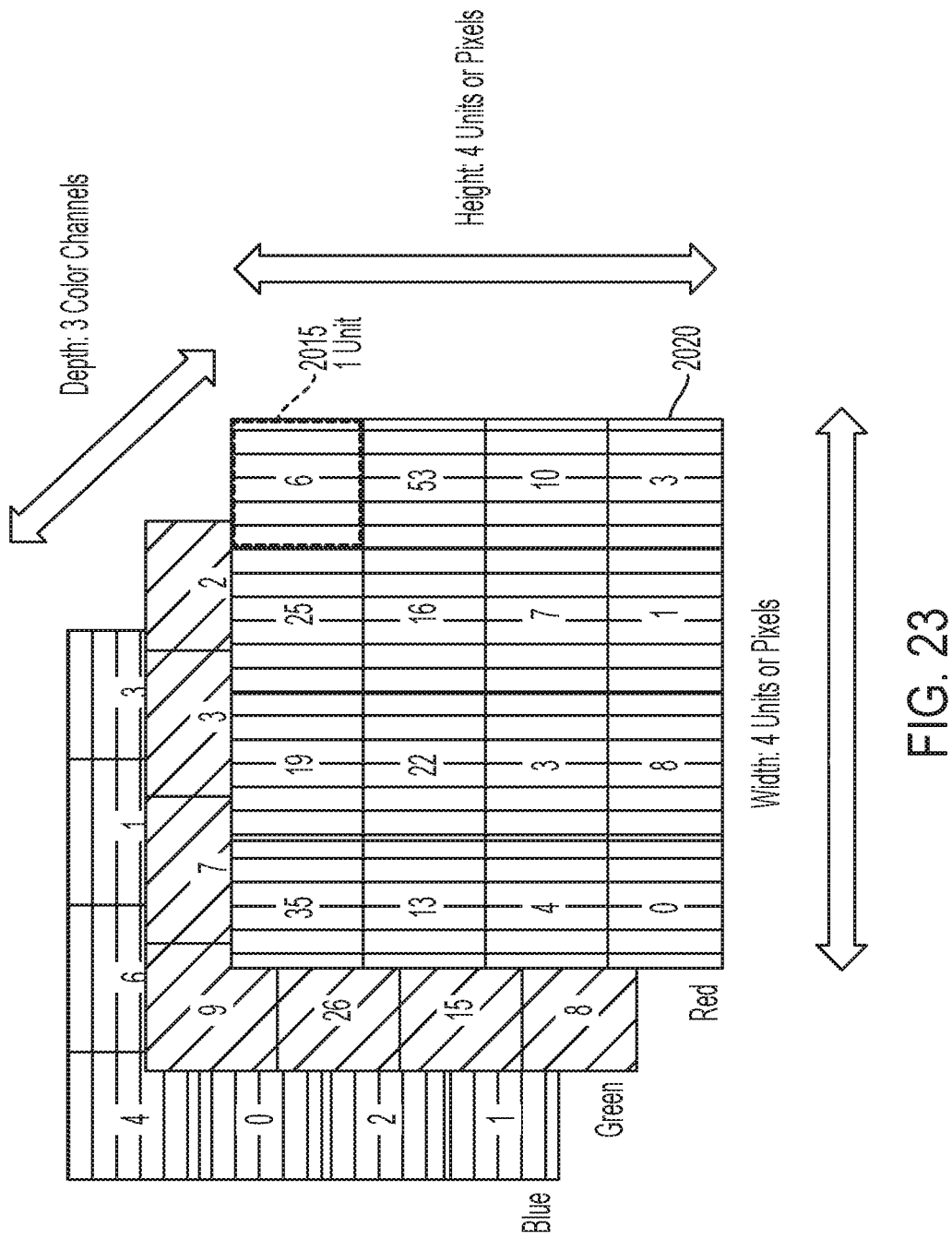
FIG. 23 depicts an illustrative 3D matrix of pixel values of an image in accordance with some embodiments of the present invention.

The first neural network 2005 is configured to receive an image, regardless of its resolution, composed of matrices of pixel values. FIG. 23 depicts illustrative matrices of pixel values of an image. Each matrix 2020 includes a width and height and each of the width and height includes a number of pixels. Each pixel is represented by a numerical value 2015 that is between 0 and 255. The pixel value 2015 represents the amount of color, e.g., the amount of redness, greenness, or blueness. There is a matrix for each color channel that produces the image. In FIG. 23, there are three color channels and there is matrix for each red, green, and blue color channel. The number of color channels determine the depth of the matrices. The matrices in FIG. 23 is a three-dimensional (3D) matrix (width, height, and depth. Although the figure only shows that the measurements of the width and height are 4 pixels each and that the image is produced by three colors, other width and height measurements and numbers of color channels are contemplated. For example, the image captured by the camera may be produced using four colors and has a resolution of 1,920 pixels×1,080 pixels. The four colors may be cyan, magenta, yellow, and black and there is a two-dimensional matrix for each color (e.g., a 1,920×1,080 matrix for cyan, a 1,920×1,080 matrix for magenta, a 1,920×1,080 matrix for yellow, and a 1,920×1,080 matrix for black). The 2D matrix of all the colors together form a 3D matrix. Therefore, the 3D matrix has a dimension of 1920×1,080×4.

In one embodiment, the resolution or dimension of the captured image is reduced to a lower resolution or dimension (e.g., by down-sampling or cropping). For example, the image may be reduced to 224×224×4 which includes a 224×224 matrix in cyan, a 224×224 matrix in magenta, a 224×224 matrix in yellow, and a 224×224 matrix in black. The resulting image may be referred to as the lower resolution image. The first neural network then computes a features vector using the lower solution image. The features vector is obtained by further reducing the resolution or dimension of the lower resolution image. For example, the first neural network may compute a features vector with a dimension of 1×1,024 from the 224×224×4 dimension. Instead of having four different colors or data to describe a feature in the image, the first neural network performs a convolution process on the lower resolution 3D image to convert it into one-dimension (1D) data representative of the 3D image or its features. The 1D data includes multiple blocks of data where each block includes information conveying the four different colors or data describing the feature in one single block of data, as opposed to four data blocks or values of the four colors. The 1D data is the features vector. In the dimension of 1×1,024, there are 1,024 data blocks.

Other resolutions, dimensions, and number of color channels are also contemplated. The software application is configured to reduce the resolution of the image captured by the camera (e.g., 1,920 pixels×1,080 pixels×4 color channels) and produce an image of the captured image or frame with reduced resolution (e.g., 224 pixels×224 pixels×4 color channels).

In one embodiment, referring, back to FIG. 22A, the first neural network 2005 is implemented using a convolution layer 2006, a rectified linear unit (ReLu) layer 2007, and a pooling layer 2008. The first neural network 2005 may include multiple convolution layers, ReLu layers, and pooling layers to compute the features vector. The convolution layer, ReLu layer, and pooling layer perform multiple iterations (e.g., on a scale of thousands or hundreds of thousands) to determine the final features vector.

The output of the first neural network 2005 is connected to the input of the second neural network (image classification component) 2010. The second neural network 2010 includes category labels implemented on a softmax layer 2012 and is configured to classify the features vector to one of the labels using a fully connected layer 2011. The second neural network 2010 classifies the features vector to the appropriate category label by determining the likelihood or percentage that the features vector falls into each category label (e.g., a classification score) and assigning the features vector to the category label with the highest percentage (e.g., 1% of chance that the features vector falls into category label A, 6% of chance that the features vector falls into category label B, and 93% of chance that the features vector falls into category label C, and assigning the features vector to category label C).

In the process of determining the percentage or classification score, the second neural network produces a 1-dimensional (1D) output vector using the features vector. The resulting 1D output vector has a vector length that is equal to the number of category labels.

By classifying or assigning the features vector to the proper category label, the image for which the features vector is computed (the image captured by the camera) is also classified to a category label. As such, the machine learning system can determine that, for example, the vehicle in the camera view (e.g., an image captured by the camera) is a Ford GT (e.g., Ford GT is one of the category labels). The category labels, for example, may include a target vehicle label for each target vehicle in the auto show (e.g., if there 17 target vehicles, then there are 17 target vehicle labels), a non-target vehicle label for non-target vehicles or vehicles outside the auto show, and a non-vehicle label for objects or scenes other than cars. For instance, the second neural network may be implemented with 19 category labels that contain 17 target vehicle labels, a non-target vehicle label, and a non-car label (boats, airlines, etc.). Each displayed vehicle in the auto show may be a target vehicle. Target vehicles may also be only a certain vehicles in the auto show.

Figure 22B:
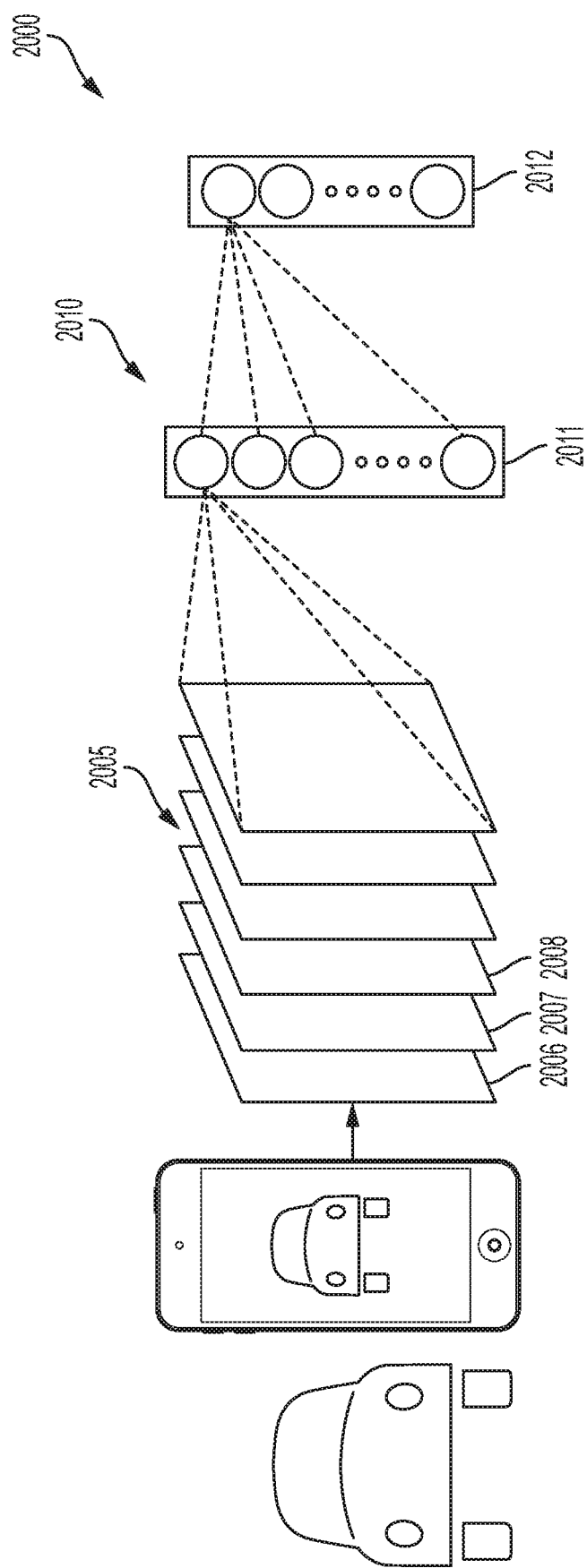
FIG. 22B depicts a simplified view of the machine learning system of FIG. 22A in accordance with some embodiments of the present invention.

FIG. 22A is a low-level or detailed view of the machine learning system 2000 whereas FIG. 22B is a high-level or simplified view of the machine learning system 2000.

Figure 24A:
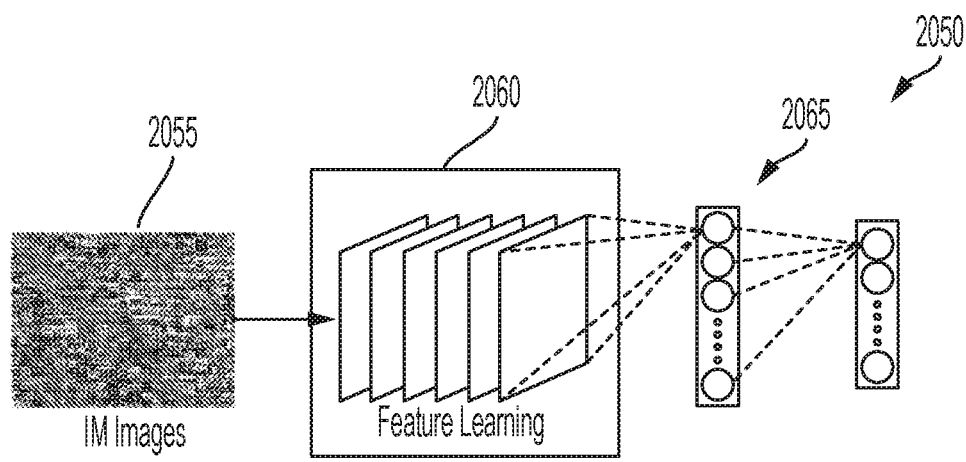
FIG. 24A depicts an illustrative feature learning component transferring process in accordance with some embodiments of the present invention.
Figure 24B:
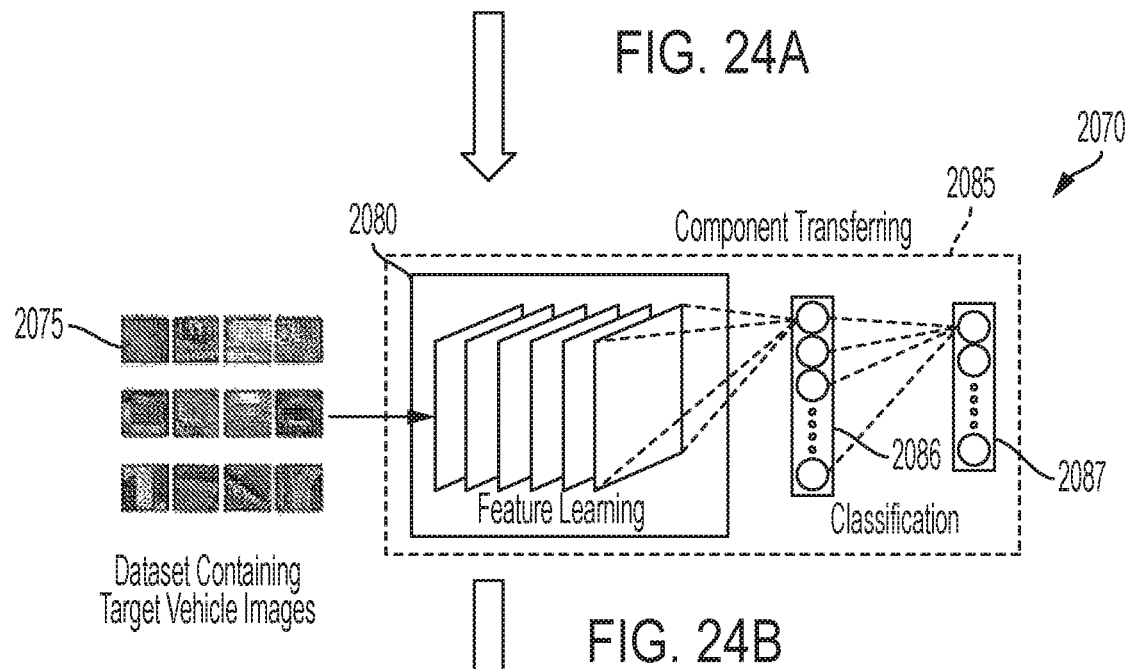
FIG. 24B depicts an illustrative image classification component training process in accordance with some embodiments of the present invention.
Figure 24C:
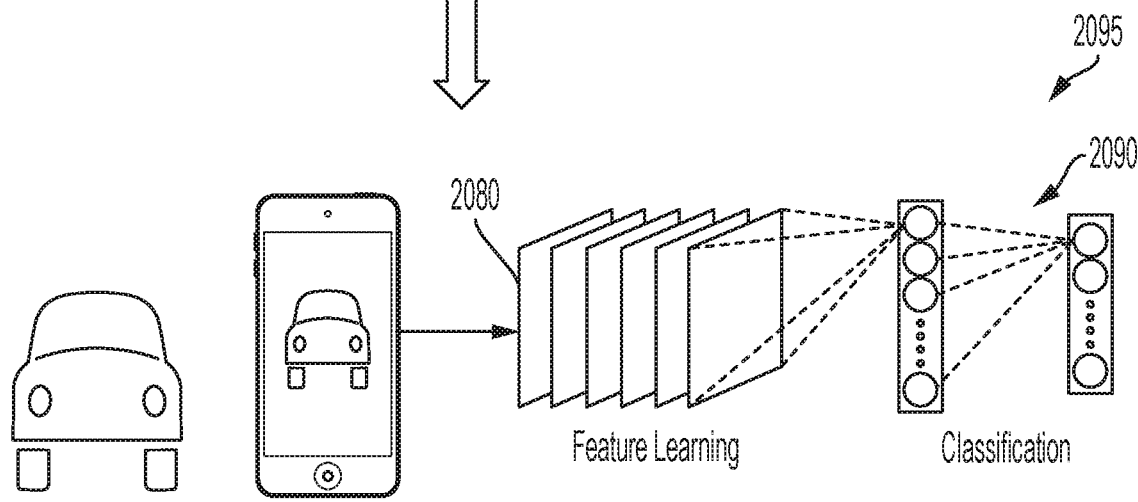
FIG. 24C depicts an illustrative machine learning system based on the processes in FIGS. 24A-24B in accordance with some embodiments of the present invention.

The first neural network can be trained and obtained from another or larger neural network that is suitable for mobile and embedded based vision applications. Such a larger or suitable neural network 2050 is shown in FIG. 24A. The neural network 2050 includes a dataset of images 2055, an image feature learning component 2060, and an image classification component 2065. The neural network 2050 includes a large dataset of images, e.g., more than 1 million of different images covering a wide range of things such as dogs, cats, cars, boats, airplanes, buildings, etc. The feature learning component 2060 is implemented using a convolution layer, a ReLu layer, and a pooling layer (or multiple such layers). The image classification component 2065 includes category labels implemented on a softmax layer (e.g., a dog label, a cat label, a car label, etc.). The feature learning component 2060 is configured to detect features (e.g., patterns, edges, shapes, colors, and other characteristics that are used to delineate an object in the image) in an image from the dataset 2055 and produce a result (e.g., an image features vector) representing the detected features. The result is provided to the image classification component 2065 that classifies the result to one of the labels using a fully connected layer (e.g., the result corresponds to a dog label and therefore the image from the dataset includes a dog). The images from the dataset 2055 are fed to the feature learning component 2060 and the convolution layer, ReLu layer, and pooling layer perform multiple iterations (e.g., on a scale of thousands or hundreds of thousands) to compute an image features vector representing the detected features. The result of each image is provided to the image classification component 2065 that classifies each result or image to one of the labels using a fully connected layer. This larger neural network 2050 may be referred as a general task neural network in that it can identify all types of objects in the image such as dogs, cats, cars, boats, airplanes, buildings, etc., as opposed to being configured to identify only a specific type of object such as cars.

The feature learning component 2060 is then separated from the general task neural network 2050 and used as the first neural network in the machine learning system described in this application. The feature learning component 2060 is also used in a custom neural network 2070. A custom neural network is a neural network that can be configured to perform a specific task. For example, a custom neural network may be configured to be a domain-specific neural network. The domain-specific neural network may identify only a specific type of object or may be trained to identify only a specific type of object. For example, the specific type of object may be cars or cars that do not appear in the image dataset of the general task neural network (e.g., target vehicles or vehicles at the auto show for which the dataset does not have images). The custom neural network 2070 includes a dataset of images 2075, an image feature learning component 2080, and an image classification component 2085. The dataset of images 2075 includes images of different angles and different portions of the object or target vehicles. The feature learning component 2060 from the general task neural network 2050 is transferred to the custom neural network 2070 and is used as the image feature learning component of the custom neural network 2070. The image classification component 2085 is implemented using a fully connected layer 2086 and a softmax layer 2087 in their original, default, or untrained form.

In such a form, the fully connected layer 2086 is configured to be ready for producing a features vector having a vector length that matches the number of category labels created on the softmax layer 2087 (e.g., the layer can produce a features vector having a matching vector length after the images from the dataset 2075 are supplied to the custom neural network 2070). In some embodiments, the fully connected layer 2086 may have a default vector that has a default vector length and be configured to adjust the default vector length to match the number of category labels created on the softmax layer 2087 after the images from the dataset 2075 are supplied to the custom neural network 2070.

The softmax layer 2087 is configured to be ready for producing a number of category labels (e.g., the layer can produce a number of category labels after the images from the dataset 2075 are supplied to the custom neural network 2070). The softmax layer 2087 may also have a number of category labels pre-created, but each label is not associated with a specific type of object ("empty category labels"). The softmax layer 2087 can create the appropriate category labels and number of category labels after the images from the dataset 2075 are supplied to the custom neural network 2070.

The image classification component 2085 of the custom neural network 2070 is then trained or modified using the images 2075 for the custom neural network 2075, or images containing objects that do not appear in the images 2055 used in the general task neural network 2050. For example, the images used in the general neural network may include an image of a Ford Taurus and an image of Ford Focus but does not include an image of a Ford GT or the Ford GT displayed on the auto show. Images such as the one of the Ford GT and other target vehicles displayed on the auto show are used to train or modify the fully connected layer 2086 and the softmax layer 2087. For example, there may be 17 target vehicles and the images may include 10 images of each target vehicle (taken at different angles or different portions of the vehicle). All the images 2075 are provided to the input of the custom neural network 2070, and the fully connected layer 2086 and the softmax layer 2087 then determine a features vector with a vector length that matches the number of category labels and create the appropriate category labels (e.g., 17 labels since there 17 target vehicles, such as a Ford GT label, a 2025 Toyota Camry label, a Honda Concept SUV, etc.), respectively. Based on the provided images or other additional images, the softmax layer can also create a non-target vehicle category label and a non-car label in addition to the 17 target vehicle category labels, with a total 19 category labels. Additional vehicle category labels can be created by supplying images of additional target vehicles.

The feature learning component 2080 and the trained image classification component 2090 are then used as the machine learning system 2095, which is the machine learning system 2000 shown in FIGS. 22A and 22B.

The machine learning system described in this application solves problems associated with conventional machine learning systems. First, conventional machine learning systems are computationally intensive. Conventional machine learning systems use traditional convolution techniques that require processing a large number of parameters. The layers in the neural network include many nodes, labels, weights, and other parameters connected together. The connected nodes, labels, weights, and other parameters are known as a graph or graphs. Traditional convolution techniques methods need to analyze every or almost every parameter in the graph and perform a series of mathematical operations (e.g., addition, subtraction, multiplication, and division). These analysis and operations, or floating point multiplication operations, demand substantial computing power. The machine learning system described in this application uses the feature learning component from a neural network that is suitable for mobile and embedded based vision applications. The feature learning component from such a neural network uses depthwise separable convolutions, as opposed to traditional convolutions, that reduce the number of parameters to be analyzed and the number of floating point multiplication operations and employ bitwise operations. In depthwise separable convolutions, some of the nodes, labels, weights, and other parameters in the graph may be discarded and the other nodes, labels, weights, and other parameters may be simplified (e.g., into 1 s and 0 s) by the convolutions. The simplified nodes, labels, weights, and other parameters are then processed using bitwise operators (e.g., AND, OR, XOR gate, etc.). The parameter reduction and bitwise operations are known as quantization. Depthwise separable convolutions include depthwise convolution followed by pointwise convolution. As such, the described machine learning system can identify an object or target vehicle faster than existing machine learning systems and by using less computational power or battery, which is critical and limited on mobile devices. As discussed earlier, the software application is installed on computing devices and computing devices are preferably mobile devices.

Second, conventional machine learning systems are configured to perform general tasks (e.g., identifying whether the object in the image is a cat, dog, car, boat, airplane, etc.) and may not be accurate in performing specific tasks (e.g., identifying whether the object in the image is a particular type of car, such as a Toyota Camry, Honda Accord, Ford Taurus, etc.). Training such systems are also complicated and time consuming because they require using a very large set of images and training the entire system, e.g., the convolution, ReLu, and pooling layers in the feature learning component and the fully connected and softmax layers in the image classification component. In the described machine learning system, the entire system does not need to be trained from scratch. The described machine learning system employs the feature learning component from a general task machine learning system that has already been trained. Therefore, in training the described machine learning system, the feature learning component only needs to be partially trained for the specific task and only the fully connected and softmax layers need to be trained from scratch. The described machine learning system also is also trained using a much smaller set of images (for the specific task) compared to a general task machine learning system. Therefore, the described machine learning system can be built with less training time and produce higher accuracy for task-specific jobs.

In another embodiment, the machine learning system is based on a pre-trained neural network (first neural network) and a neural network (second neural network) to be trained using the pre-trained neural network or knowledge gained from the pre-trained neural network. The pre-trained neural network can detect patterns, edges, shapes, colors, and other characteristics in an image or frame (the image feature detection component or feature learning component), and use the detected patterns, edges, shapes, and other characteristics to determine what the underlying object in an image is (the image determination component or image classification component).

The first neural network is pre-trained using pattern detection processes, shape detection processes, color detection processes, and other processes. After the first neural network is trained to detect patterns, edges, shapes, and other characteristics, the first neural network is further trained to determine what the object in an image is using those detection capabilities by providing the first neural network with a number of images containing different objects (e.g., cats, dogs, cars, boats, airplanes, etc.). The images can depict different types of the object and be classified according to those types. The first or pre-trained neural network takes a 224×224 pixel 4-channel image as an input and computes a 1×1024 vector representation of the image's features. After training the first neural network with those images, the first neural network can determine that the object in a new image (received after the training session or in a non-training operation) is object A.

The machine learning system includes the detection component (or learning component), or knowledge gained from the detection component, and combines the detection component with the second neural network. The second neural network is configured to receive a set of images that are different from the set received by the first neural network. The image sets may be different in that both sets cover the same or similar types of objects (e.g., cats, airplanes, and boats), but the image set used in the second neural network (the second set) includes additional images for the same or similar types of objects that are not in the set used in the first neural network (the first set). For example, the second set may include images of the same cats, airplanes, or boats in the first set but are taken at different angles or show different portions of the same cats, airplanes, or boats. The image sets may also be different in that the first set includes a number types of objects (e.g., cats, airplanes, and boats) and the second set includes images of another type of object (e.g., cars) that is not in the first set. The image sets may also be different in that the first set covers several types of objects (e.g., cats, airplanes, boats, and cars) and the second set includes images to supplement a particular type of object (e.g., cars that are no in the first set). For example, the set of images received by the second neural network includes an image of Ford FT that is not in the set received by the first neural network. Other combinations and variations are also contemplated.

The number of images received by the second neural network (e.g., on the scale of 100 or 1000) is also much smaller than the number of images received by the first neural network (e.g., on the scale millions). The second neural network is trained to determine what the objects are in the smaller set by using the detection capabilities from the detection component by providing the second neural network with the smaller set of images. After training the second neural network with those images, the second neural network can determine that the object in a new image (received after the training session or in a non-training operation) is object B. The second neural network includes a fully connected layer and a softmax layer. The second neural network takes as an input, the 1×1024 representation of the image, and produces a 1D output vector with the same length as the number of categories.

Weights learned from training deep networks on large but generic data sets (pre-trained neural network) can be effectively used to initialize models for other domains and other data sets. The image features (patterns, edges, object etc.) learned by the base model (first or pre-trained neural network) generalize well to the more specific classification task performed by the top layer (second neural network). Conversely, the top layer can be effectively trained with much less data given that it does not have to learn low-level image features from scratch.

The machine learning system including the detection component of the first neural network and the second neural network is provided with a dataset containing vehicle images (e.g., 250,00 images or other number of images) from a number of different sources. The images can be classified into different vehicle categories by make, model, year, and other factors. These categories can be further combined or used in a manner to provide a number of higher level categories (e.g., Honda CRV, unknown SUV) that can be used by the software application to easily communicate the identified vehicle to the user. The machine learning system is trained with those images by using detection capabilities from the detection component in a private Cloud environment or other private environment. After training the second neural network, this neural network becomes a trained neural network for vehicle images.

In one embodiment, the machine learning system includes a characteristic detection system configured to detect characteristics (e.g., patterns, edges, shapes, etc.) in a dataset (e.g., a set of images) regarding an object (e.g., each image contains the object) and a second system trained using the characteristic detection system and a dataset (e.g., another set of images) regarding another object (e.g., each image in the other set contains another object or different object). The characteristic detection system is trained to make such detections by using a dataset regarding an object. For instance, the system is provided with a number of images that each contains the object. The system is trained to detect patterns, edges, and/or shapes in those images. The characteristic detection system may be a pre-trained neural network or a component of a pre-trained neural network. The second system is trained using the characteristic detection system to recognize or identify the other object in each image of the other set. For instance, the system is provided with a number of images that each contains a different object. The system is trained to recognize or identify the other object in the other set of images by using the pattern, edge, and/or shapes detection techniques learned from the characteristic detection system.

For example, when the user at the auto show captures an image using the software application, the image's data is sent to the machine learning system. After the machine learning system analyses the data, the system provides information about the vehicle and the information is displayed on the screen of the computing device. The machine learning system may also provide information about possible vehicles that match the vehicle in the image and the confidence score for each possible vehicle.

Preferably, the machine learning system or the software application containing the machine learning system is configured to operate locally on the computing device. The machine learning system or the software application is installed on the computing device and operates on the computing device without communicating with another computer system or server over a network. This implementation allows the machine learning system to operate without depending on a network connection and will work in the absence of an Internet connection. On-device operation allows provides a faster user experience because the machine learning system does not need to communicate with the Cloud or other devices over a network. Users will be able to receive real-time identification result from the machine learning system in the camera view. On-device operation also helps circumvent privacy issues as there are no images being sent to other computer system or server over a network. On-device implementation is also cheaper compared to Cloud version and more reliable if usage of the machine learning system increases (e.g., high Cloud usage may cause the server to crash). Although on-device implementation is preferred, Cloud-implementation, server implementation (e.g., implementing the machine learning system on the server described earlier in the application), and other over-the-network implementations (or a combination of on-device implementation and Cloud-implementation) are also viable if necessary.

The database includes car cards and content cards that each contains vehicle information about a vehicle presented at the auto show.

The step of recognizing or identifying means that the software application determines that the vehicle in the camera view or image matches or closely matches a vehicle in the database (a vehicle to be unlocked). The vehicles in the database can be vehicles that are presented at the auto show or vehicles that are outside of the auto show.

The computing device is preferably a handheld mobile device so that the user can carry the mobile device and use the camera on the mobile device to identify vehicles as he goes through the auto show. A handheld mobile device can be a mobile phone, tablet computer, personal digital assistant (PDA), cellular device, or other mobile computers that have a microprocessor and memory. The computing device can also be a desktop computer, laptop computer, or other type of devices having a microprocessor and memory.

The software application is particularly suited for automobiles and automobile shows, but is also applicable to motorcycles, boats, airplanes, and other types of vehicles and their exhibitions. The software application can also be used for other objects such as books, furniture, building structures, appliances, or other device. The software application can also be used to play scavenger hunt games based on those items.

In some embodiments, the software application is configured to allow users to use their mobile phone in general such as on a public street to direct to the camera at automobiles or other vehicular transportation. The software application will be configured to use an image from the camera to identify the vehicle. Preferably, the software application is configured to allow the mobile phone to identify make, model, and year of the model and preferably including any special model series or type (e.g., a special edition model, or limited series model of the vehicle). The software application will retrieve and present vehicle details such as performance, ratings, engine, size, safety history, or price. It can also retrieve additional images from a server with the details to present to the user as an informational capsule about the vehicle. The user can then save the capsule for later retrieval and evaluation (or for sharing with others).

Although in one embodiment the software application is described with respect to using an image of a vehicle to identify the vehicle, the software application can also work with video. The software application can extract a frame or multiple frames from the video in order to obtain necessary information to identify the vehicle.

The term image (or frame) can also refer to image data representative of the image (or frame data representative of the frame), and vice versa.

Category labels implemented on a softmax layer may refer to category labels produced by a softmax layer.

A computing device or server includes a processor and memory (transitory storage) storing computer executable instructions. The software application includes computer instructions executable by the processor that are stored in memory. When the processor executes the instructions of the software application, the instructions cause the processor to perform the features described above. The computing device or server also includes a network interface configured to communicate with a communications network. A communication network may be Internet, a cellular network, a telephone network, a computer network, a packet switching network, a line switching network, a local area network (LAN), a wide area network (WAN), a global area network, or a private network (Intranet). The network interface is configured to support the communications network, allowing one computing device or server to receive data from and transmit data to another computing device or server over the communications network. The computing device or server also includes non-transitory storage, I/O circuitry, and other electronic components.

A server may have larger memory and larger non-transitory storage capacity than those of a computing device and has the capability of sustaining concurrent data communication with multiple end users or client devices. The described handheld mobile device may be a client device.

Database may be implemented by software, hardware, or a combination of software and hardware. Database may comprise non-volatile media and/or volatile media. Non-volatile media includes, for example, optical or magnetic disks, such as storage device. Volatile media includes dynamic memory, such as main memory. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Counterpart method, computer-readable medium, and system embodiments would be understood from the above and the overall disclosure. Also, broader, narrower, or different combinations of the described features are contemplated, such that, for example features can be removed or added in a broadening or narrowing way.

It will readily be understood by one having ordinary skill in the relevant art that the present invention has broad utility and application. Other embodiments may be discussed for additional illustrative purposes in providing a full and enabling disclosure of the present invention. Moreover many embodiments such as adaptations, variations, modifications, and equivalent arrangements will be implicitly disclosed by the embodiments described herein and fall within the scope of the present invention.

Accordingly, while the embodiments of the present invention are described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended nor is to be construed to limit the scope of patent protection afforded by the present invention, which scope is to be defined by the claims (to be drafted based on the disclosure) and the equivalents thereof. It is not intended that the scope of patent protection afforded the present invention be defined by reading into any claim a limitation found herein that does not explicitly appear in the claim itself.

Thus for example any sequence(s) and/or temporal order of steps of various processes or methods (or sequence of system connections or operation) that are described herein are illustrative and should not be interpreted as being restrictive. Accordingly, it should be understood that although steps of various processes or methods (or connections or sequence of operations) may be shown and described as being in a sequence or temporal order, but they are not necessarily limited to being carried out in any particular sequence or order. Other sequences or temporal order is contemplated and would be understood to exist by those of ordinary skill in the art. In addition systems or features described herein are understood to include variations in which features are removed, reordered, or combined in a different way.

Additionally it is important to note that each term used herein refers to that which the ordinary artisan would understand such term to mean based on the contextual use of such term herein. It would be understood that terms that have component modifiers are intended to communicate the modifier as a qualifier characterizing the element, step, system, or component under discussion.

The words "may" and "can" are used in the present description to indicate that this is one embodiment but the description should not be understood to be the only embodiment.

Although the present invention has been described and illustrated herein with referred to preferred embodiments, it will be apparent to those of ordinary skill in the art that other embodiments may perform similar functions and/or achieve like results. Thus it should be understood that various features and aspects of the disclosed embodiments can be combined with or substituted for one another in order to form varying modes of the disclosed invention.

What is claimed is:

1. A mobile device for identifying a vehicle at an exhibition event and to obtain information about the vehicle, comprising:
   a memory device configured to maintain a first database including target vehicles in the exhibition event and a second database including prize information; and
   a processor and non-volatile memory comprising a set of computer-readable instructions, wherein the processor is configured to execute the computer readable instructions to:
   communicate with a camera of the mobile device configured to capture a frame;
   identify an object in the view of the camera, wherein the step of identifying includes recognizing that the object in the view matches or closely matches a target vehicle stored in the first database and displaying vehicle information of the target vehicle when the identified object matches or closely matches the target vehicle on a screen of the mobile device;
   track a number of preselected vehicles;
   identify the target vehicle to which the object in the view of the camera matches or closely matches as a preselected vehicle; and
   present prize information from the second database on the screen of the mobile device according to the identification of preselected vehicles.

2. The mobile device of claim 1, wherein information of each of the target vehicles stored in the first database is inaccessible to user of the mobile device before the target vehicle is identified by the mobile device as a preselected vehicle.

3. The mobile device of claim 1, wherein the processor is further configured to execute the computer readable instructions to implement a control interface configured to control user access to the information of each of the target vehicles stored in the first database.

4. The mobile device of claim 3, wherein the control interface is configured to require user of the mobile device to perform additional interactions with the mobile device after the mobile device recognizing that the object in the view of the camera matches or closely matches a target vehicle stored in the first database in order to identify the target vehicle as preselected vehicle.

5. The mobile device of claim 1, wherein the processor is further configured to execute the computer readable instructions to compare the number of preselected vehicles with another number of preselected vehicles tracked by another mobile device.

6. The mobile device of claim 5, wherein the processor is further configured to execute the computer readable instructions to present prize information from the second database on the screen of the mobile device based on the step of comparison.

7. The mobile device of claim 1, wherein the processor is further configured to execute the computer readable instructions to present prize information from the second database on the screen of the mobile device when a specific target vehicle is identified as preselected.

8. The mobile device of claim 1, wherein the step of identifying a vehicle is executed by a machine learning machine, the machine learning machine including:
a detection component of a pre-trained neural network, wherein the detection component is configured to detect patterns, edges, shapes, and other characteristics of an object in a set of images containing the object, wherein the object is not a vehicle; and
a neural network configured to receive another set of images that each contains a vehicle and relied on the detection component to learn that each image contains the vehicle.

9. The mobile device of claim 1, wherein the step of identifying an object is executed by a machine learning machine, the machine learning machine including:
a first artificial neural network configured to receive the frame, detect features of the object in the frame, and produce a features vector representative of the detected features; and
a second artificial neural network configured to receive the features vector and classify the features vector to one of the category labels implemented on the second artificial neural network;
wherein the machine learning system is configured to identify the object in the frame based on the category label to which the features vector is classified.

10. The mobile device of claim 1, wherein the step of identifying an object is executed by a machine learning machine, the machine learning machine including:
a first artificial neural network configured to receive the frame, detect features of the object in the frame, and produce a features vector representative of the detected features, wherein the first artificial neural network is a feature learning neural network from a general task artificial neural network that has been trained with images from a large dataset, wherein the images from the large dataset include no images of the target vehicles; and
a second artificial neural network configured to receive the features vector and classify the features vector to one of the category labels implemented on the second artificial neural network, wherein the second artificial neural network is an image classification neural network from a custom neural network and the image classification neural network has been trained using the feature learning neural network from a general task artificial neural network and with images from a small dataset, wherein the images from the small dataset include images of the target vehicles.

11. A non-transitory computer readable medium storing computer-executable instructions that causes a mobile device to execute a method for identifying an object at an exhibition event and to obtain information about the objects and unlock prizes, the method comprising:
maintaining on the mobile device a first database including target objects in the exhibition event and a second database including prize information, wherein execution of the computer-executable instructions allows a processor and memory of the mobile device to:
communicate with a camera of the mobile device configured to capture a frame;
identify an object in the view of the camera, wherein the step of identifying includes recognizing that the object in the view matches or closely matches a target object stored in the first database and displaying object information of the target object when the identified object matches or closely matches the target object on a screen of the mobile device;
track a number of preselected objects;
identify the target object to which the object in the view of the camera matches or closely matches as preselected object; and
present prize information from the second database on the screen of the mobile device according to the identification of preselected objects,
wherein the object, target object, and preselected object, are objects of a specific type of objects.

12. The medium of claim 11, wherein information of each of the target objects stored in the first database is inaccessible to user of the mobile device before the target object is identified by the software application as a preselected object.

13. The medium of claim 11, wherein the execution of the computer-executable instructions allows a processor and memory of the mobile device to further implement a control interface configured to control user access to the information of each of the target objects stored in the first database.

14. The medium of claim 13, wherein the control interface is configured to require user of the mobile device to perform additional interactions with the mobile device after the mobile device recognizing that the object in the view of the camera matches or closely matches a target object stored in the first database in order to identify the target object as preselected object.

15. The medium of claim 11, wherein the execution of the computer-executable instructions allows a processor and memory of the mobile device to further compare the number of preselected objects with another number of preselected vehicles tracked by another mobile device.

16. The medium of claim 15, wherein the execution of the computer-executable instructions allows a processor and memory of the mobile device to further present prize information from the second database on the screen of the mobile device based on the step of comparison.

17. The medium of claim 11, wherein the execution of the computer-executable instructions allows a processor and memory of the mobile device to further present prize information from the second database on the screen of the mobile device when a specific target object is identified as preselected.

18. The medium of claim 11, wherein the step of identifying an object is executed by a machine learning machine, the machine learning machine includes:
   a detection component of a pre-trained neural network, wherein the detection component is configured to detect patterns, edges, shapes, and other characteristics of an object in a set of images containing the object, wherein the object is not an object of the specific type of object; and
   a neural network configured to receive another set of images that each contains an object of the specific type of object and relied on the detection component to learn that each image contains the object of the specific type of object.

19. The medium of claim 11, wherein the step of identifying an object is executed by a machine learning machine, the machine learning machine includes:
   a first artificial neural network configured to receive the frame, detect features of the object in the frame, and produce a features vector representative of the detected features; and
   a second artificial neural network configured to receive the features vector and classify the features vector to one of the category labels implemented on the second artificial neural network;
   wherein the machine learning system is configured to identify the object in the frame based on the category label to which the features vector is classified.

20. The medium of claim 11, wherein the step of identifying an object is executed by a machine learning machine, the machine learning machine includes:
   a first artificial neural network configured to receive the frame, detect features of the object in the frame, and produce a features vector representative of the detected features, wherein the first artificial neural network is a feature learning neural network from a general task artificial neural network that has been trained with images from a large dataset, wherein the images from the large dataset include no images of the target objects; and
   a second artificial neural network configured to receive the features vector and classify the features vector to one of the category labels implemented on the second artificial neural network, wherein the second artificial neural network is an image classification neural network from a custom neural network and the image classification neural network has been trained using the feature learning neural network from a general task artificial neural network and with images from a small dataset, wherein the images from the small dataset include images of the target objects.

* * * * *